US011124911B2

(12) United States Patent
Kim et al.

(10) Patent No.: US 11,124,911 B2
(45) Date of Patent: Sep. 21, 2021

(54) WASHING MACHINE AND CONTROL METHOD OF WASHING MACHINE

(71) Applicant: LG Electronics Inc., Seoul (KR)

(72) Inventors: Beomjun Kim, Seoul (KR); Woore Kim, Seoul (KR); Sangwook Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 232 days.

(21) Appl. No.: 16/283,244

(22) Filed: Feb. 22, 2019

(65) Prior Publication Data

US 2019/0264370 A1 Aug. 29, 2019

(30) Foreign Application Priority Data

Feb. 23, 2018 (KR) .................... 10-2018-0022113

(51) Int. Cl.
*D06F 39/00* (2020.01)
*D06F 33/00* (2020.01)
(Continued)

(52) U.S. Cl.
CPC .............. *D06F 34/28* (2020.02); *D06F 33/00* (2013.01); *D06F 39/04* (2013.01); *D06F 39/045* (2013.01);
(Continued)

(58) Field of Classification Search
CPC ........ D06F 39/045; D06F 33/00; D06F 39/04; D06F 34/28; D06F 2202/04; D06F 58/30;
(Continued)

(56) References Cited

U.S. PATENT DOCUMENTS 1,999,446 A * 4/1935 Delano ................. H05B 6/108
219/630
2,817,157 A 12/1957 Mccormick
(Continued)

FOREIGN PATENT DOCUMENTS

CN 1075993 9/1993
CN 1080969 1/1994
(Continued)

OTHER PUBLICATIONS

PCT International Search Report in International Application No. PCT/KR2019/002210, dated Jun. 14, 2019, 4 pages.
(Continued)

*Primary Examiner* — Benjamin L Osterhout
(74) *Attorney, Agent, or Firm* — Fish & Richardson P.C.

(57) ABSTRACT

A washing machine includes: a tub; a drum; an induction heater disposed in a position spaced apart from the drum and configured to heat the drum; an input power source; a relay configured to interrupt a current applied to the coil of the induction heater from the input power source; a first processor configured to control the relay; and a safety device connected to a circuit connecting the first processor and the relay. The safety device includes: a first thermostat configured to operate according to a temperature of a first air between the drum and the tub, and open the circuit when the temperature of the first air is a first safety control temperature; and a thermal fuse configured to operate according to a temperature of a second air outside the tub, and open the circuit when the temperature of the second air is a second safety control temperature.

20 Claims, 18 Drawing Sheets

(51) Int. Cl.
  *D06F 34/28* (2020.01)
  *D06F 39/04* (2006.01)
  *D06F 25/00* (2006.01)
  *D06F 58/26* (2006.01)
  *D06F 37/42* (2006.01)
  *D06F 58/30* (2020.01)
  *D06F 58/50* (2020.01)
  *D06F 105/28* (2020.01)

(52) U.S. Cl.
  CPC .............. *D06F 25/00* (2013.01); *D06F 37/42* (2013.01); *D06F 58/26* (2013.01); *D06F 58/30* (2020.02); *D06F 58/50* (2020.02); *D06F 2105/28* (2020.02); *D06F 2202/04* (2013.01); *D06F 2204/04* (2013.01)

(58) Field of Classification Search
  CPC .. D06F 58/26; D06F 2105/28; D06F 2204/04; D06F 37/42; D06F 58/50; D06F 25/00
  See application file for complete search history.

(56) References Cited

U.S. PATENT DOCUMENTS

| | | | |
|---|---|---|---|
| 5,347,610 A | 9/1994 | Lee | |
| 5,394,582 A | 3/1995 | Moon | |
| 10,808,350 B2* | 10/2020 | Park | D06F 39/04 |
| 2002/0117497 A1* | 8/2002 | Bassill | H05B 6/062 |
| | | | 219/626 |
| 2004/0123490 A1* | 7/2004 | Pancheri | D06F 58/203 |
| | | | 34/597 |
| 2005/0057108 A1* | 3/2005 | Kim | H02K 7/083 |
| | | | 310/67 R |
| 2008/0282568 A1 | 11/2008 | Oh et al. | |
| 2008/0284558 A1 | 11/2008 | Scheiber et al. | |
| 2009/0056175 A1 | 3/2009 | Pinkowski et al. | |
| 2010/0083711 A1 | 4/2010 | Han et al. | |
| 2016/0115634 A1 | 4/2016 | Lundbom | |
| 2018/0148886 A1* | 5/2018 | Kalze | H05B 6/06 |

FOREIGN PATENT DOCUMENTS

| | | |
|---|---|---|
| CN | 1600939 | 3/2005 |
| CN | 1690294 | 11/2005 |
| CN | 101161915 | 4/2008 |
| CN | 102216510 | 10/2011 |
| DE | 3905398 | 8/1990 |
| DE | 102013207088 | 10/2014 |
| DE | 102014208514 | 11/2015 |
| DE | 102016110859 | 6/2017 |
| EP | 1382289 | 1/2004 |
| EP | 1914339 | 4/2008 |
| EP | 2400052 | 12/2011 |
| JP | H0759994 | 3/1995 |
| JP | H08252393 | 10/1996 |
| KR | 1020020038375 | 5/2002 |
| KR | 100407046 | 11/2003 |
| KR | 1020040096144 | 11/2004 |

OTHER PUBLICATIONS

Chinese Office Action in Chinese Application No. 201910133639.X, dated Oct. 30, 2020, 15 pages (with English translation).
Extended European Search Report in European Application No. 19158735.1, dated Jul. 11, 2019, 12 pages.

* cited by examiner

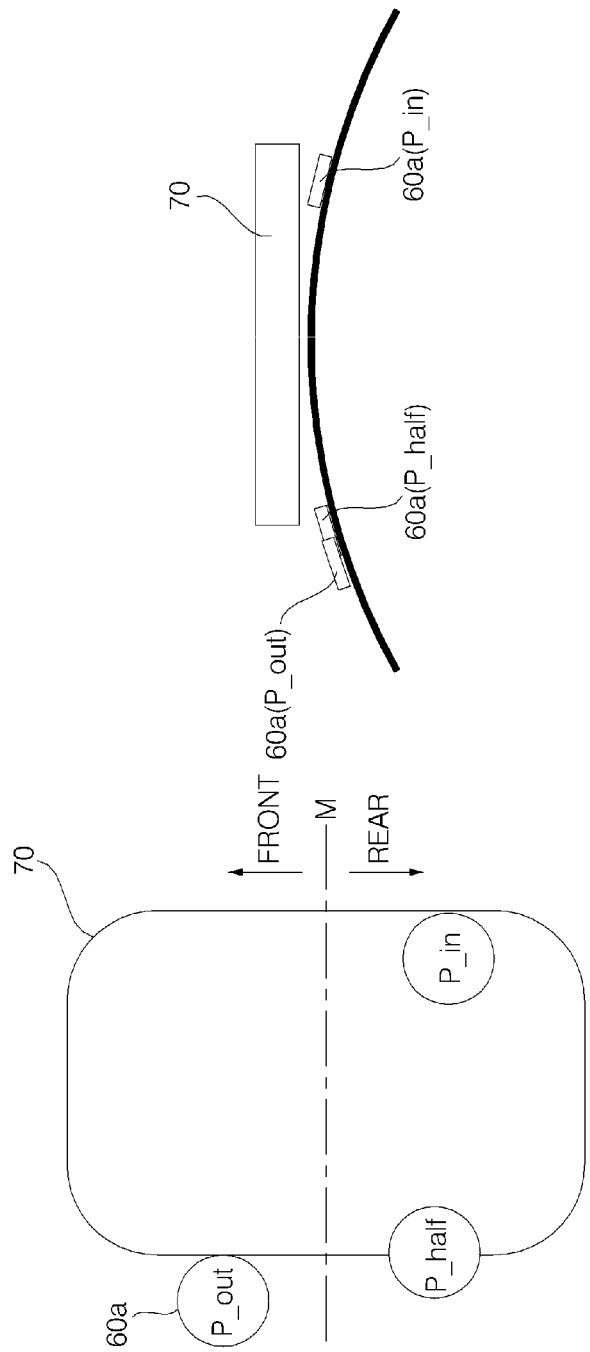

WASHING MACHINE AND CONTROL METHOD OF WASHING MACHINE

CROSS-REFERENCE TO RELATED APPLICATION

This application claims the priority benefit of Korean Patent Application No. 10-2018-0022113, filed on Feb. 23, 2018, in the Korean Intellectual Property Office, the disclosure of which is incorporated herein by reference.

TECHNICAL FIELD

The present disclosure relates to a washing machine having an induction heater and a control method thereof.

BACKGROUND

Generally, in a washing machine, a drum accommodating laundry is rotatably provided in a tub for providing a space for containing water. Through holes are formed in the drum, water in the tub flows into the drum, and the laundry is moved by the rotation of the drum to remove contamination.

Conventional washing machine may be provided with a heater for heating the water in the tub. The heater is, generally, operated in a state of being submerged inside the tub, and directly heats the water. However, such a heater should be operated in a state of being always submerged in the water for safety reasons. That is, the heater may be used for heating the water in the tub. However, the heater is not suitable for heating the air in the drum in the state where there is no water in the tub, or for heating the wet laundry As a washing machine which directly heats a drum in contact with laundry regardless of whether the tub is filled with water, JP2004135998A discloses a washing drying machine (or a washing machine having a drying function) provided with a non-contact type heating device using microwave, electromagnetic induction, infrared rays, and the like.

In addition, EP2400052A1 discloses a washing machine in which a drum is heated by an induction heating system. In this washing machine, a heat sensor is disposed between the drum and a tank (or the tub) is configured to detect the temperature of water or the temperature of air in the tank, and control the induction heating system based on such detected value.

However, since the method of controlling the temperature using the heat sensor is based on the premise that the washing machine operates normally, when the heat sensor malfunctions or when a failure occurs in a controller for processing a signal of the heat sensor, the control over the induction heating system is also unreliable, which may cause a safety accident due to overheating.

SUMMARY

The present disclosure has been made in view of the above problems, and provides a washing machine in which the operation of the induction heater is automatically stopped when the temperature of the drum using the temperature sensor is not normally controlled and the drum is overheated.

The present disclosure further provides a washing machine having a safety device for automatically blocking the power applied to the induction heater, not only when the drum is overheated, but also when the induction heater is overheated. In particular, the present disclosure further provides a washing machine in which a circuit for transmitting a control signal to a relay for applying a current of an input power to the induction heater is opened by the safety device.

The present disclosure further provides a washing machine capable of still driving the motor for rotating the drum even if the power applied to the induction heater is blocked by the safety device.

The present disclosure further provides a washing machine configured to include a first safety control means for reversibly opening a circuit for applying power to the induction heater, and a second safety control means for irreversibly opening the circuit when the overheating condition is not resolved despite the first safety control.

The present disclosure further provides a washing machine having a thermostat as the first safety control means, and a thermal fuse as the second safety control means.

The present disclosure further provides a washing machine in which the position of the thermostat is optimized so that the thermostat may be sensitive to temperature changes of the drum.

The present disclosure further provides a washing machine in which the position of the thermal fuse is optimized so that the thermal fuse may be sensitive not only to the heat of the drum but also to the heat of the induction heater.

The present disclosure further provides a washing machine having a thermostat which reversibly blocks the circuit by the heat of the induction heater before the thermal fuse is operated.

In accordance with an aspect of the present disclosure, a washing machine includes: a drum of metal material configured to be disposed in the tub; and an induction heater configured to heat the drum in a state of being separated from the drum, and to heat the drum, and includes a relay configured to interrupt a current applied to the induction heater from an input power source. The relay is controlled by a first processor, and a safety device is connected to a circuit connecting the relay and the first processor.

The safety device includes a first thermostat configured be disposed between the drum and the tub and operate according to a temperature of a first air. The first thermostat opens the circuit when the temperature of the first air is a first safety control temperature.

The safety device includes a thermal fuse configured to operate according to a temperature of a second air outside the tub. The thermal fuse opens the circuit when the temperature of the second air is a second safety control temperature.

The relay applies an input power to the coil of the induction heater according to a signal received from the first processor. When the circuit is opened and the relay is no longer able to receive the signal, the supply of current from the input power source to the induction heater is interrupted.

The input power is AC power. The washing machine further includes a rectifier configured to rectify the AC power transmitted through the relay and a switching element configured to switch an output of the rectifier. The output of the switching element is inputted to the coil.

The washing machine further includes a motor configured to rotate the drum. The first processor controls a rotation of the motor. The washing machine further includes a second processor configured to control an operation of the switching element under the control of the first processor.

The safety device includes a second thermostat configured to operate by a heat of the induction heater and open the circuit. The second thermostat is disposed outside the tub.

The washing machine further includes at least one temperature sensor configured to detect a temperature of air between the drum and the tub. The first processor controls the induction heater within a preset control temperature range based on the temperature detected by the at least one temperature sensor.

The at least one temperature sensor includes: a first temperature sensor configured to have a tube of metal material heated by the induction heater and a thermistor disposed in the tube, wherein at least a part of the tube is exposed between the tub and the drum, and a second temperature sensor configured to be disposed in a position further away than the first temperature sensor in a circumferential direction from the induction heater and detect the temperature of air between the tub and the drum.

The first processor controls the induction heater based on a second detection value of the second temperature sensor, when a rising amount of a first detection value of the first temperature sensor does not reach a first reference rising amount until a certain set time elapses after operation of the induction heater is started.

The first processor controls the induction heater based on a first detection value of the first temperature sensor if the rising amount of a second detection value of the second temperature sensor does not reach the second reference rising amount until a predetermined set time elapses after the operation of the induction heater is started.

The first safety control temperature is a value which the temperature of the first air reaches when the temperature of the drum falls within a preset first safety temperature range, and has a smaller value than a lower limit of the first safety temperature range. A first safety temperature range is between 190 and 200 degrees Celsius.

The second safety control temperature is a temperature of the second air set to correspond to a case where the temperature of the drum is in a second safety temperature range having a larger value than the first safety temperature range, and the second safety temperature range is larger than the first safety temperature range. The second safety temperature range is between 220 and 240 degrees Celsius.

When the temperature of the second air falls within the second safety temperature range, the temperature of the coil ranges from 110 to 130 degrees Celsius.

BRIEF DESCRIPTION OF THE DRAWINGS

The objects, features and advantages of the present disclosure will be more apparent from the following detailed description in conjunction with the accompanying drawings, in which:

FIG. 14A shows the positions where a first thermostat can be installed based on an induction heater 70, and FIG. 14B shows the state where the first thermostat is installed in respective positions when viewed from the front of a tub;

DETAILED DESCRIPTION

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
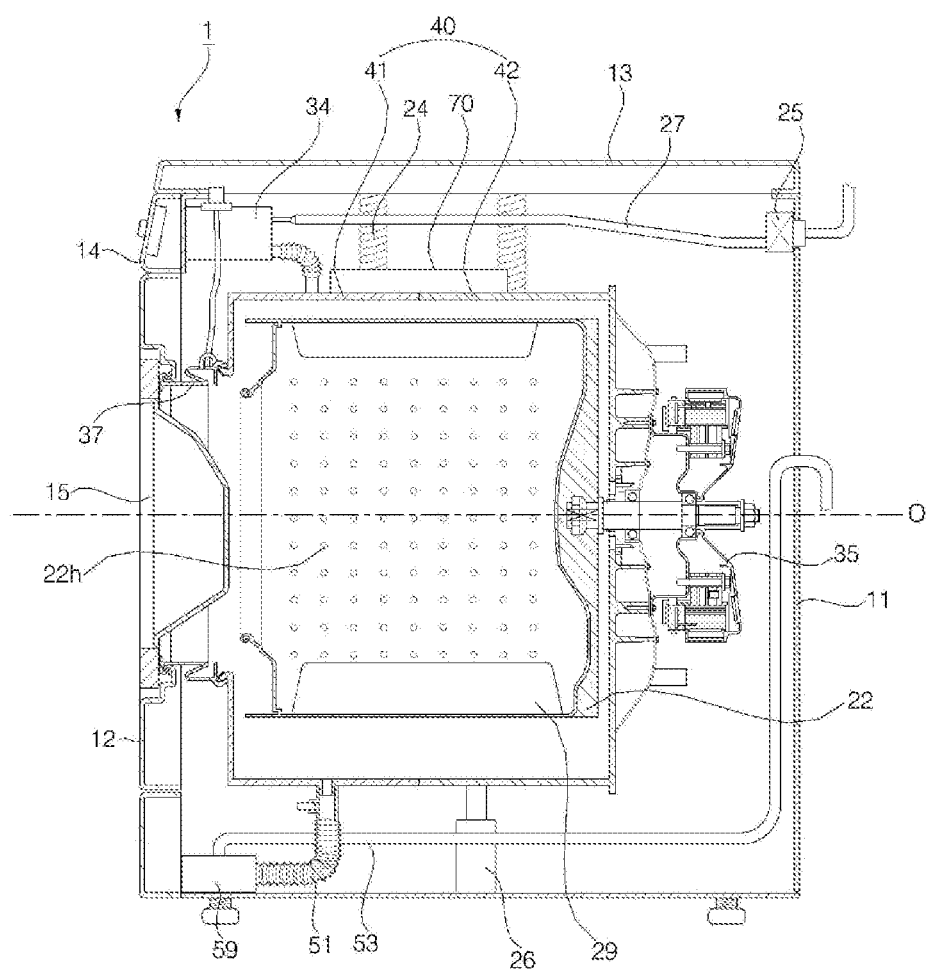
FIG. 1 is a side sectional view of a washing machine according to an embodiment of the present disclosure.
Figure 2:
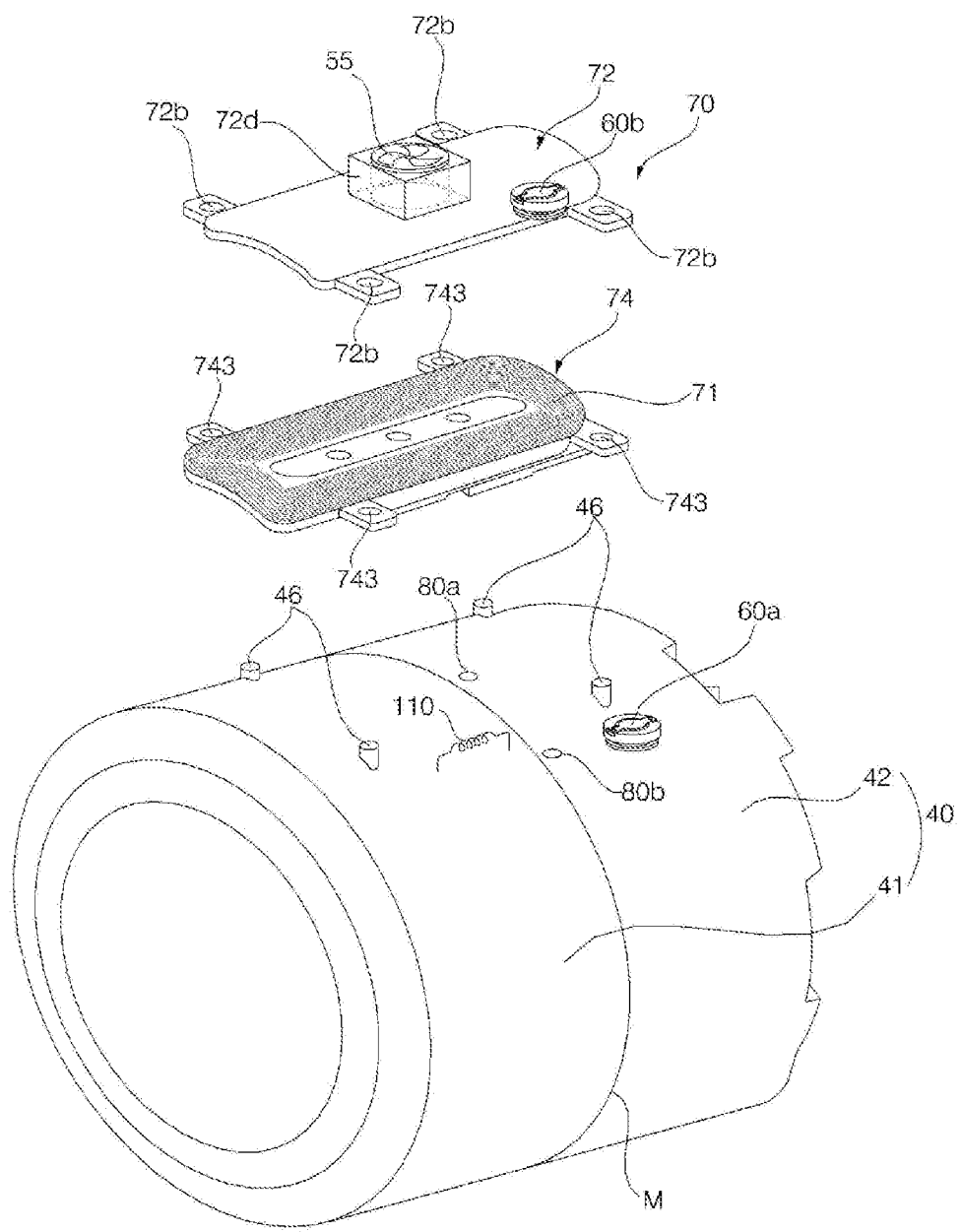
FIG. 2 is an exploded perspective view of a tub and an induction heater.
Figure 3:
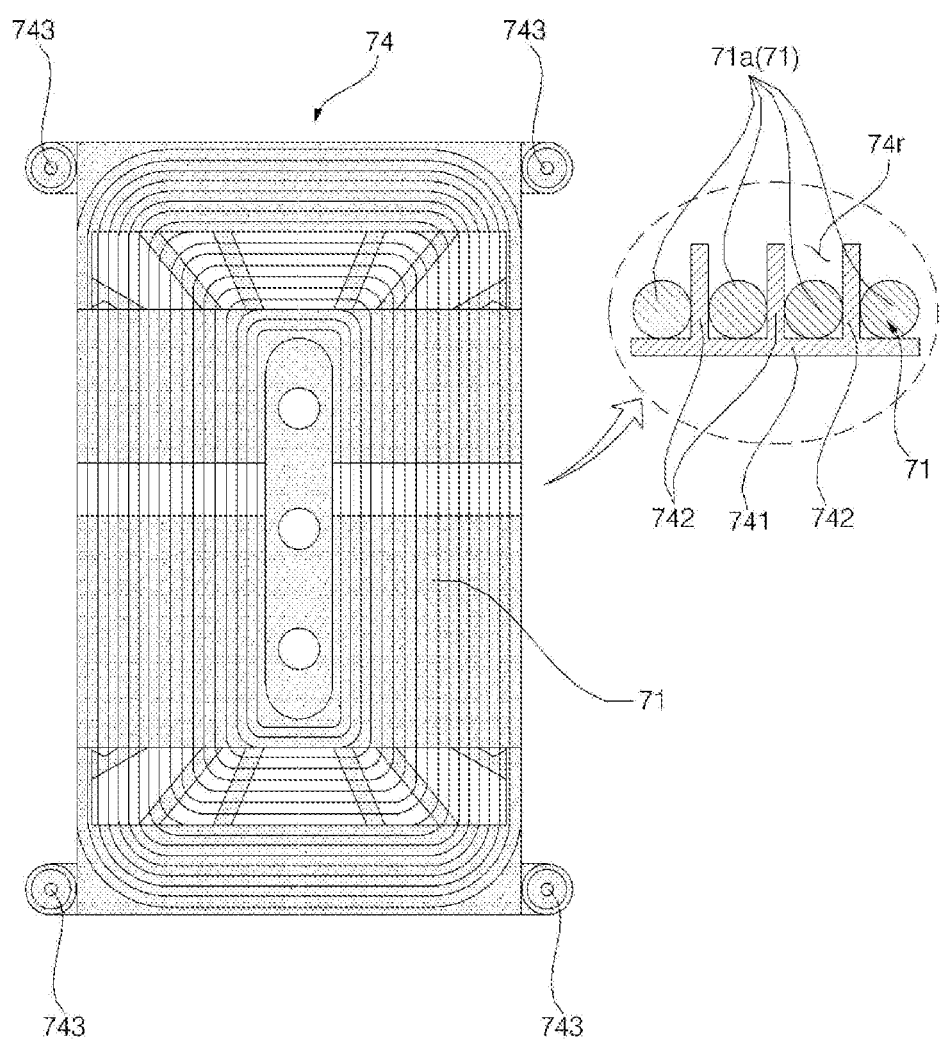
FIG. 3 is a plan view of a heater base shown in FIG. 2.

FIG. 1 is a side sectional view of a washing machine according to an embodiment of the present disclosure. FIG. 2 is an exploded perspective view of a tub and an induction heater. FIG. 3 is a plan view of a heater base shown in FIG. 2.

Referring to FIGS. 1 to 3, a casing 11, 12, 13, 14 forms an outer shape of a washing machine 1 according to an embodiment of the present disclosure, and an input port into which laundry is inputted is formed on the front surface of the washing machine. The casing may include a cabinet 11 which has a front surface opened, a left surface, a right surface, and a rear surface, and a front panel 12 which is coupled to the open front surface of the cabinet 11 and has the input port formed therein. In addition, the casing 11, 12, 13, 14 may further include a top plate 13 covering the opened upper surface of the cabinet 11 and a control panel 14 disposed above the front panel 12.

In the casing 11, 12, 13, 14, a tub 40 for containing water is disposed. The tub 40 has an opening formed on the front surface thereof so as to allow laundry to be inputted, and the opening communicates with the input port formed in the casing 11, 12, 13, 14 by a gasket 37. The tub 40 may be configured in such a manner that a tub front portion 41 forming a front portion of the tub 40 and a tub rear portion forming a rear portion of the tub 40 are coupled to each other.

The front panel 12 is rotatably provided with a door 15 for opening and closing the input port. The control panel 14 is provided with a display unit (not shown) for displaying various state information of the washing machine 1 and an input unit (not shown) for receiving various control commands such as a washing course, operating time for each process, reservation from a user.

A dispenser 34 for supplying an additive such as laundry detergent, fabric softener, or bleaching agent to the tub 40 is provided. The dispenser 34 includes a detergent box in which the additive is contained, and a dispenser housing in which the detergent box is removably stored. A water supply hose 27 connected to an external water source such as a faucet to receive raw water, and a water supply valve 25 for interrupting the water supply hose 27 may be provided. When the water supply valve 25 is opened and water is supplied through the water supply hose 27, the detergent in the detergent box is mixed with water and flows into the tub 40.

The tub 40 may be suspended from the top cover 13 by a spring 24, and may be supported by a damper 26 disposed in a lower side. Therefore, the vibration of the tub 40 is buffered by the spring 24 and the damper 26.

A drum 22 is rotatably disposed in the tub 40. The drum may be implemented of a material (or a material whose current is induced by a magnetic field (or a magnetic force) or a ferromagnetic body) heated in a non-contact type by a later-described induction heater 70. Preferably, the drum 22 may be implemented of metal material, e.g., stainless steel. A plurality of through holes 22h may be formed in the drum 22 so that water can be exchanged between the tub 40 and the drum 22.

The washing machine according to the present embodiment is a front loading type in which the drum 22 is rotated about a horizontal axis O. However, the present disclosure is also applicable to a washing machine of a top loading type. In this case, a drum rotated about a vertical axis is provided.

The drum 22 is rotated by a driving unit 35, and a lifter 29 is provided inside the drum 22 so as to lift laundry. The driving unit 35 may include a motor capable of controlling a rotation direction and a speed. The motor is preferably a brushless direct current electric motor (BLDC), but it is not necessarily limited thereto.

A drainage bellows 51 for discharging the water in the tub 40 to the outside, and a pump 59 for pumping the water discharged through the drainage bellows 51 to a drainage hose 53 may be provided. The water pumped by the pump 59 is discharged to the outside of the washing machine through the drainage hose 53.

An induction heater 70 for heating the drum 22 is provided. The induction heater 70 is a heater that uses an induction current generated by a magnetic field as a heat source. When a metal is placed in a magnetic field, an eddy current is generated in the metal due to electromagnetic induction and the metal is heated due to Joule heat.

The induction heater 70 is fixed to the tub 40 while being spaced apart from the drum 22. When the induction heater 70 is operated, the drum 22 of metal material is heated. The tub 40 is implemented of a material (preferably, synthetic resin) through which a magnetic field can pass, and the induction heater 70 is disposed outside the tub 40. However, it is not limited thereto, and the induction heater 70 can be disposed inside the tub 40.

The induction heater 70 may include a coil 71 to which a current is applied, a heater base 74 that fixes the coil 71, and a heater cover 72 which is coupled to the heater base 74 and covers the coil 71 from the upper side of the coil 71.

The heater base 74 may be fixed to the tub 40. The heater base 74 may be disposed in the outer side of the tub 40, preferably, in the upper side of the tub 40. The heater base 74 has a first coupling tab 743 provided with a fastening hole. Four first coupling tabs 743 may be symmetrically disposed. A fastening boss 46 is formed, in the tub 40, at a position corresponding to the first coupling tab 743. The heater base 74 has a substantially flat shape, but preferably has a shape substantially corresponding to the curvature of the outer circumferential surface of the tub 40. The heater base 74 is implemented of a material through which a magnetic field can pass, and is preferably a synthetic resin material.

The coil 71 is fixed to the upper surface of the heater base 74. In an embodiment, the coil 71 is formed by winding a single conducting wire 71a several times based on homocentricity on the upper surface of the heater base 74, but may be formed of a plurality of conducting wires in the form of a closed curve having homocentricity according to an embodiment.

A fixing rib 742 for fixing the coil 71 is protruded from an upper surface 741 of the heater base 74. The fixing rib 742 is wound while maintaining a gap 74r corresponding to the diameter of the conducting wire 71a forming the coil 71. The coil 71 may be formed by winding the conducting wire 71a along the gap 74r.

The heater cover 72 may be provided with a ferromagnetic body. The ferromagnetic body may include ferrite. The ferromagnetic body may be fixed to the bottom surface of the heater cover 72. Since the high resistance of the ferrite prevents the generation of eddy current, a current is intensively induced in the drum 22 positioned in the lower side of the coil 71, so that the drum 22 can be effectively heated.

The heater cover 72 may be provided with a cooling fan for cooling the coil 71. The heater cover 72 may be provided with a fan mount 72d that forms an air passage for ventilating a space in which the coil 71 is accommodated. The cooling fan 55 may be disposed in the air passage.

The heater cover 72 is provided with a second coupling tab 72b having a fastening hole at a position corresponding to the first coupling tab 743 of the heater base 74. A screw (not shown) may pass through the second coupling tab 72b and the first coupling tab 743 sequentially, and then be fastened to the fastening boss 46.

Meanwhile, in order to process the laundry in the drum 22 at a desired temperature, the temperature of the drum 22 should be accurately controlled. The temperature of the drum 22 is greatly affected by the output of the induction heater 70. The amount of the laundry inputted in the drum 22, the amount of water contained in the tub 40, the rotation speed of the drum 22, and the amount of water contained in the laundry are affected by various factors. Therefore, it is difficult to obtain an accurate value when estimating the temperature of the drum 22 by only the output (or input) of the induction heater 70.

Furthermore, it is assumed that the processes such as washing, rinsing, dewatering, drying, are usually performed by rotating the drum 22. Thus, it is difficult to use a contact type temperature sensor to measure the temperature of the rotating drum 22.

For these reasons, the present disclosure includes two temperature sensors 80a and 80b configured to detect the temperatures of air of two points between the drum 22 and the tub 40, and the temperature of the drum 22 is estimated based on the values detected by these temperature sensors 80a and 80b.

Since this method measures the temperature of the air and estimates the temperature of the drum 22 based on the temperature of the air, it does not directly measure the temperature of the drum 22. However, by using the value detected by two temperature sensors 80a and 80b, it is possible to estimate the temperature of the drum 22 more accurately and to detect the temperature change of the drum 22 more sensitively than in the conventional case where the temperature is sensed through a single temperature sensor.

Figure 4:
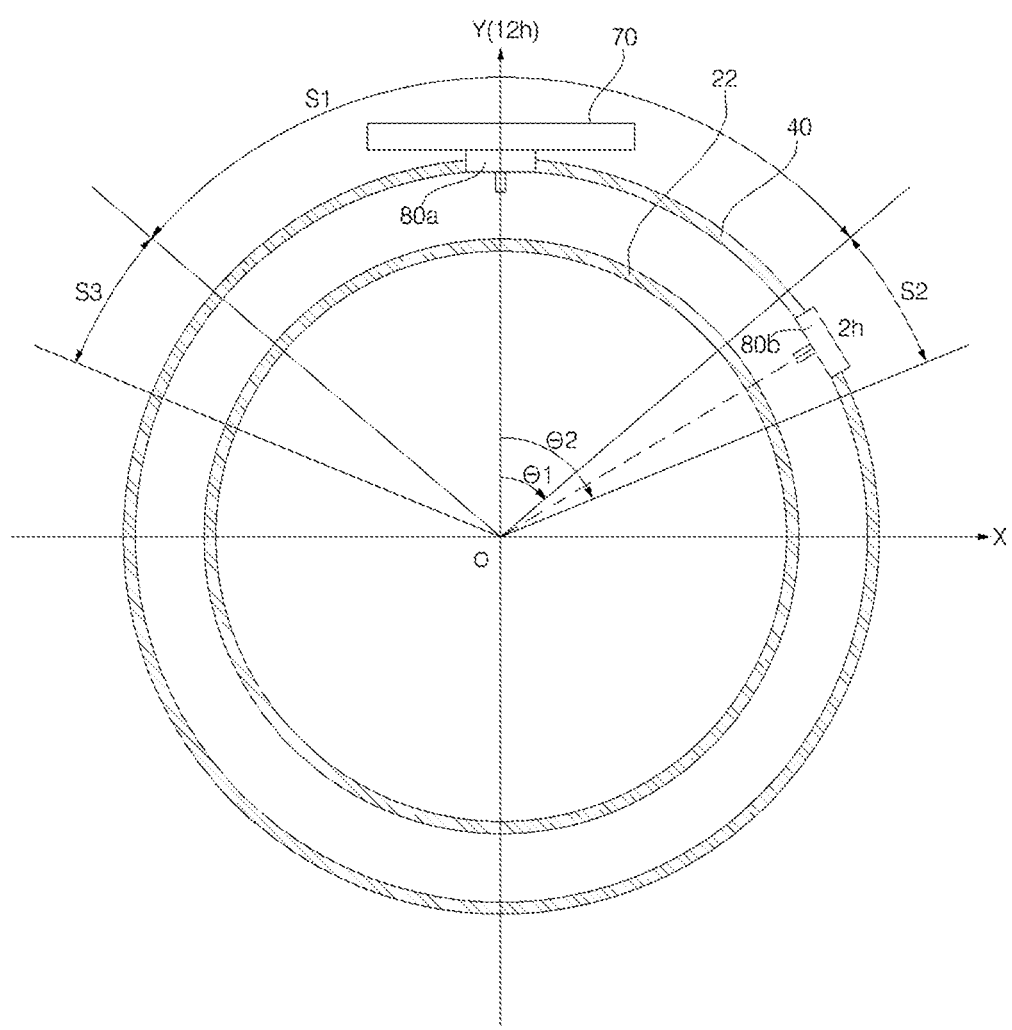
FIG. 4 schematically shows a position where a first temperature sensor and a second temperature sensor are installed.
Figure 5B:
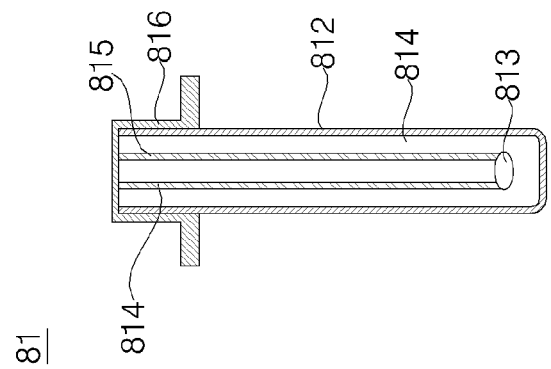
FIG. 5B shows a cross section of a thermistor.
Figure 5A:
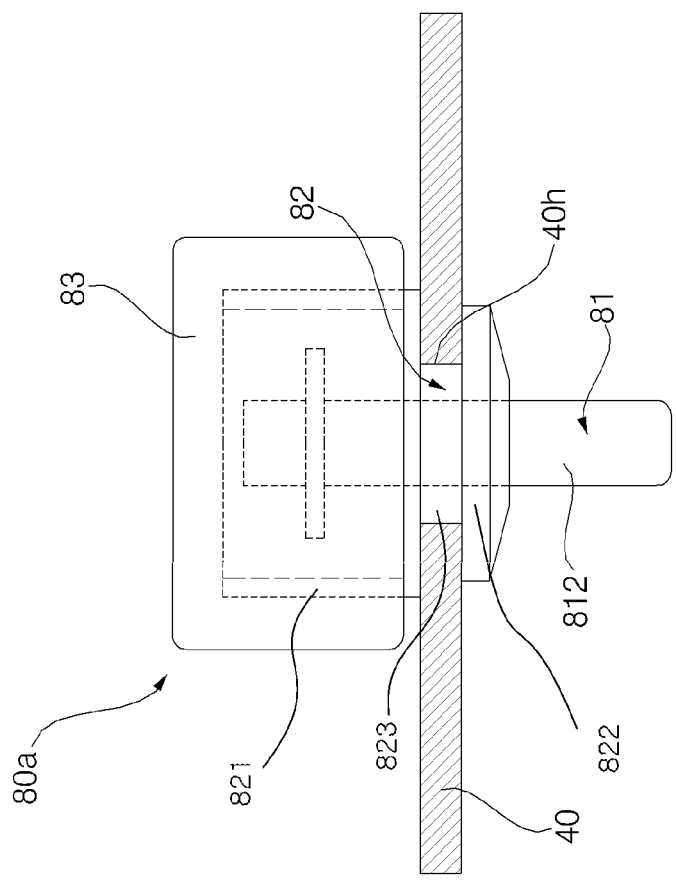
FIG. 5A shows a state where a first temperature sensor is installed in a tub.
Figure 6:
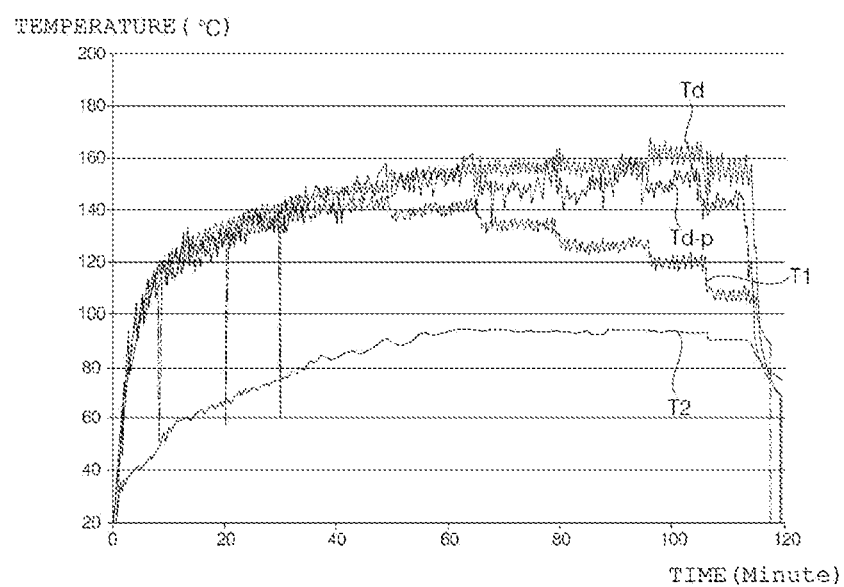
FIG. 6 is a graph showing the changes over time of the actual temperature Td of a drum, the detection value T1 of a first temperature sensor, the detection value T2 of a second temperature sensor, and the estimated value Td of drum temperature, when an induction heater is controlled in a certain pattern.
Figure 7:
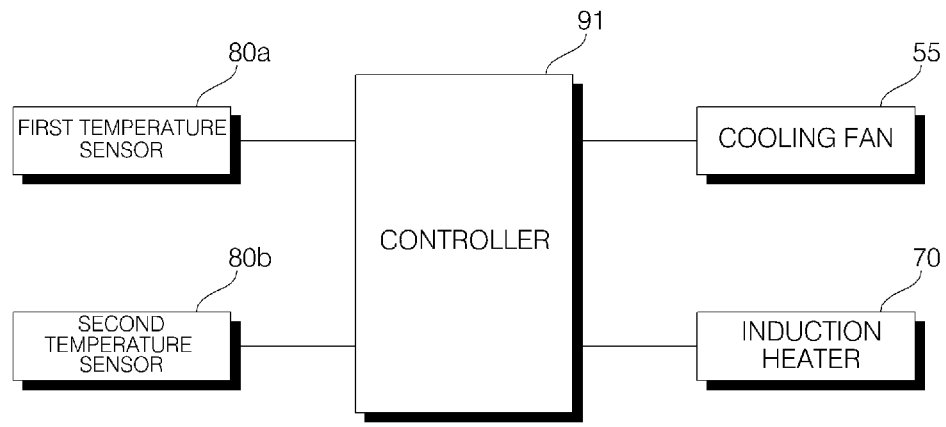
FIG. 7 is a block diagram showing a control relationship between main components of a washing machine according to an embodiment of the present disclosure.
Figure 8:
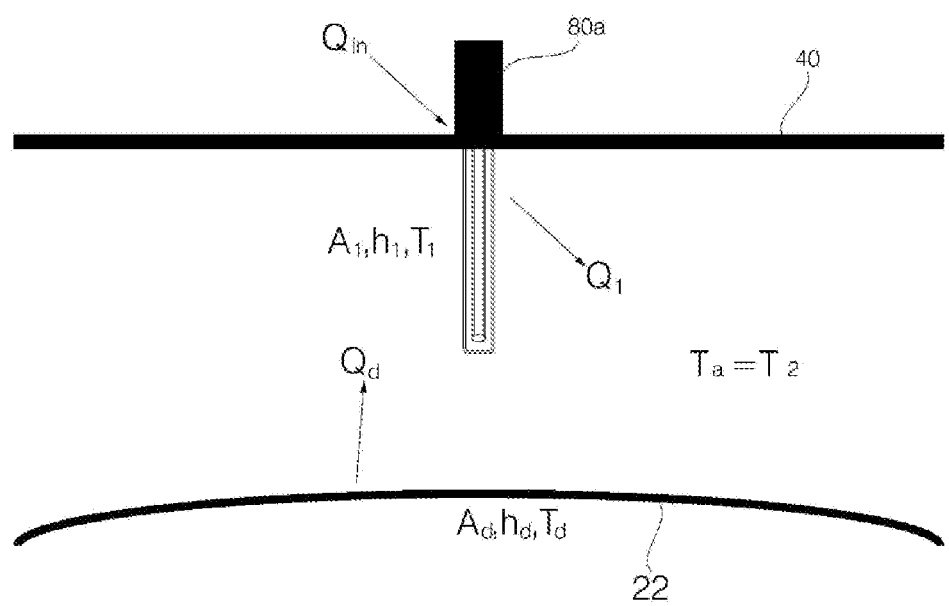
FIG. 8 shows the heat amount transferred between an induction heater, a drum, and a first temperature sensor, which are referred to in the process of obtaining the estimated value of drum temperature.

FIG. 4 schematically shows a position where a first temperature sensor and a second temperature sensor are installed. FIG. 5A shows a state where a first temperature sensor is installed in a tub, and FIG. 5B shows a cross section of a thermistor. FIG. 6 is a graph showing the changes over time of the actual temperature Td_p of a drum, the detection value T1 of a first temperature sensor, the detection value T2 of a second temperature sensor, and the estimated value Td of drum temperature, when the induction heater is controlled in a certain pattern. FIG. 7 is a block diagram showing a control relationship between main components of a washing machine according to an embodiment of the present disclosure. FIG. 8 shows the heat amount transferred between an induction heater, a drum, and a first temperature sensor, which are referred to in the process of obtaining the estimated value of drum temperature.

Referring to FIGS. 4 to 8, two temperature sensors 80a and 80b include a first temperature sensor 80a and a second temperature sensor 80b. The first temperature sensor 80a itself is heated by the induction heater 70, and the temperature detected by the first temperature sensor 80a under the normal operating condition of the washing machine is higher than the temperature Ta of the air in the tub 40. That is, in a state of being heated by the induction heater 70, the first temperature sensor 80a is a heating element that transmits heat to the air in the tub 40, and the heat amount transmitted to the air at this time is indicated by Q1 in FIG. 8.

Referring to FIG. 5, the first temperature sensor 80a may include a thermistor assembly 81 and a heat insulating cover 83. The thermistor assembly 81 may include a tube 812 made of a material (preferably, metal) that is heated by the induction heater 70, and a thermistor 813 disposed in the tube 812. Here, at least a part of the outer surface of the tube 812 is exposed between the tub 40 and the drum 22 to sense the temperature of the air. The tube 812 is heated by the induction heater 70 while an induction current flows through the metal so that the temperature of the tube 812 is reflected in the temperature obtained through the thermistor 813 disposed in the tube 812.

The upper end of the tube 812 is open so that the thermistor 813 can be inserted into the tube 812. Two lead wires 814 and 815 for inputting and outputting a current are connected to the thermistor 813 and a filler for fixing the thermistor 813 and the lead wires 814 and 815 is filled in the tube 812. The filler is made of a material that transmits heat but does not conduct electricity.

The open upper end of the tube 812 is closed by a cap 816. The cap 816 is provided with a pair of terminals connected to two lead wires 814 and 815 respectively, and is connected to a certain circuit electrically connected to a controller 91.

A sensor installation port 40h is formed in the tub 40, and the tube 812 passes through the sensor installation port 40h. The first temperature sensor 80a may include a soft sealer 82 that seals hermetically between the tube 812 and the sensor installation port 40h. The sealer 82 has a cylindrical shape extended in the longitudinal direction of the tube 812, and the tube 812 is disposed inside the sealer 82. The tube 812 passes through a hollow formed in the sealer 82. The sealer 82 may include an upper side portion 821 located outside the tub 40, a lower side portion 822 located inside the tub 40, and a connection portion 823 which connects the upper side portion 821 and the lower side portion 822 and is inserted into the sensor installation port 40h. The lower surface of the upper side portion 821 may be brought into close contact with the outer surface of the tub 40, and the upper surface of the lower surface portion 822 may be brought into close contact with the inner surface of the tub 40.

The upper surface of the upper side portion 821 may be opened to form a recessed space inside thereof. The hollow through which the tube 81 passes may pass the upper side portion 821, the connection portion 823, and the lower side portion 822 sequentially.

The connection portion 823 may have a radius smaller than the upper side portion 821 and the lower side portion 822. The circumference of the sensor installation port 40h of the tub 40 may be inserted into a fixing groove 82r formed by a radial difference between the upper side portion 821 and the upper end of the connection portion 823 and a radial difference between the lower side portion 822 and the lower end of the connection portion 823.

Meanwhile, the heat insulating cover 83 covers the portion of the first temperature sensor 80a protruded to the outside of the tub 40. The heat insulating cover 83 may close the open upper surface of the upper side portion 821 of the sealer 82. The heat insulating cover 83 is made of a material (e.g., synthetic resin or rubber) having good heat insulation property. Since the inside of the sealer 82 is insulated to a certain degree by the heat insulating cover 83, the influence of the temperature outside the tub 40 on the detection value of the first temperature sensor 80a is reduced.

Similarly to the first temperature sensor 80a, the second temperature sensor 80b detects the temperature of the air between the tub 40 and the drum 22, but is disposed in a position further away than the first temperature sensor 80a along the circumferential direction from the induction heater 70.

Here, the second temperature sensor 80b is preferably configured not to be affected by the induction heater 70. For example, the second temperature sensor 80b may be configured of a sensor that is not affected by the magnetic field generated by the induction heater 70. For example, the second temperature sensor 80b may be configured with the exception of the metal part (e.g., tube 812) that is heated by the induction heater 70. However, in this case, since the second temperature sensor 80b should be configured differently from the first temperature sensor 80a, the commonality of parts is low. Thus, it is preferable to dispose the second temperature sensor 80b in a position where the influence of the induction heater 70 is substantially insufficient, while the second temperature sensor 80b has the same structure as the first temperature sensor 80a.

Referring to FIG. 4, the second temperature sensor 80b may be disposed in a position of 55 degrees to 65 degrees from the first temperature sensor 80a with respect to the center O of the drum 22. This section may be provided in both sides of the Y axis passing through the center of the drum 22, and this section is indicated by S2(θ1=55°, θ2=65°) and S3 in FIG. 4.

In FIG. 4, S1 indicates an effective heating range in which the first temperature sensor 80a is disposed. The effective heating range S1 may include an area vertically downward from the induction heater 70.

The tube 81 of the first temperature sensor 80a is positioned below the induction heater 70, and is preferably positioned in an area overlapped with the induction heater 70 when viewed from the top in a vertical direction. The first temperature sensor 80a is preferably positioned at 12 o'clock (12h) with reference to FIG. 4, but is not necessarily limited thereto.

Meanwhile, on a side surface of the tub 40, a cooling water port (not shown) may be provided to supply cooling water for condensing moisture in the air in the tub 40. It is preferable that the first temperature sensor 80a and the second temperature sensor 80b are disposed above the cooling water port so that the influence of the condensed water is excluded when temperature is detected.

The controller 91 (e.g., a first processor 91a described later) may control the induction heater 70 based on a first detection value T1 of the first temperature sensor 80a and the second detection value T2 of the second temperature sensor 80b. Specifically, the controller 91 may obtain the temperature Td of the drum 22 based on the linear combination of the first detection value T1, and may control the induction heater 70 so that the temperature Td of the drum 22 is controlled within a preset range.

The controller 91 may obtain the temperature Td of the drum 22 based on the first detection value T1 and the second detection value T2, and may control the output of the induction heater 70 or the operation of the cooling fan 55 based on the obtained temperature Td (exactly, an estimated value of the actual temperature of the drum 22 (see FIG. 6)) of the drum 22. Hereinafter, a method of obtaining the temperature Td of the drum 22 will be described in more detail.

The temperature Td of the drum 22 may be obtained according to the following temperature equation (Equation 1) obtained by linearly combining the first detection value T1 and the second detection value T2. The controller 91 may control the induction heater 70 based on the obtained temperature Td.

$$Td=Z(T1-T2)+T2 \quad \text{(Equation 1)}$$

Here, Td=temperature of the drum, Z=correction coefficient, T1=first detection value, T2=second detection value.

The process of obtaining the above equations is explained in more detail.

The drum 22 and the first temperature sensor 80a heated by the induction heater 70 generate heat so that the temperature Ta of the air in the tub 40 is increased, which is expressed as follows.

$$Q\text{in}=Qd+Q1 \quad \text{(Equation 2)}$$

$$Q1=A1h1(T1-Ta) \quad \text{(Equation 3)}$$

$$Qd=Adhd(Td-Ta) \quad \text{(Equation 4)}$$

Here, Qin is the heat amount outputted from the induction heater 70, Qd is the heat value of the drum 22 heated by the induction heater 70, Q1 is the heat value of the first temperature sensor 80a heated by the induction heater 70, Ta is the temperature of the air between the tub 40 and the drum 22, A1 is the heat generating area of the first temperature sensor 80a, Ad is the heat generating area of the drum 22, h1 is the heat transfer coefficient of the first temperature sensor 80a, and hd is the heat transfer coefficient of the drum 22.

It is assumed that the drum 22 has a uniform temperature Td, the temperature Ta of the air in the tub 40 is also uniform, and the second temperature sensor 80b is not influenced by the induction heater 70.

$$Q\text{in}=(Td-Ta)+A1h1(T1-Ta) \quad \text{(Equation 5)}$$

Here, the shape coefficient p and the heat value coefficient q are defined as follows, $$p=A1h1/Adhd \quad \text{(Equation 6)}$$

$$q=Q1/Qd \quad \text{(Equation 7)}$$

Equation 5 is summarized using Equation 6 as follows.

$$Td=Q\text{in}Adhd+(1+p)Ta-pT1 \quad \text{(Equation 8)}$$

Here, the following equations may be obtained by using Equation 2 and Equation 4 to summarize.

$$Td=(Qd+Q1Qd)/Qd(Td-Ta)+(1+p)T-pT1 \quad \text{(Equation 9)}$$

The following equation may be obtained by substituting Equation 7 into Equation 9.

$$Td=(1+q)(Td-Ta)+(1+p)Ta-pT1 \quad \text{(Equation 10)}$$

Equation 9 may be summarized by using the shape coefficient p and the heat value coefficient q, and the correction coefficient Z may be defined as follows.

$$Z=p/q=(Td-Ta)/(T1-Ta) \quad \text{(Equation 11)}$$

$$Td=Z(T1-Ta)+Ta \quad \text{(Equation 12)}$$

Here, since Ta is a value obtained by the second temperature sensor 80b, Ta=T2, and Equation 12 becomes the same as the temperature equation of Equation 1. In this process, the second detection value T2 obtained by the second temperature sensor 80b is compensated by a difference between the first detection value T1 obtained by the first temperature sensor 80a and the second detection value T2, so that the temperature Td of the drum 22 can be obtained.

Meanwhile, in Equation 11, the correction coefficient Z is obtained by taking the shape coefficient p and the heat value coefficient q as factors. The shape coefficient p is a coefficient whose value is determined according to the shape of the first temperature sensor 80a and the drum 22, and the heat value coefficient q is a variable determined by the output (input from the viewpoint of control) of the induction heater 70 and the quantity of state.

Therefore, Z can be expressed as follows.

$$Z=ZconstZpower \quad \text{(Equation 13)}$$

Here, Zconst is a constant, and Zpower is a variable according to the input of the induction heater 70.

As shown in the temperature equation (Equation 1), if the detection value T1 of the first temperature sensor 80a and the detection value T2 of the second temperature sensor 80b are known, the estimated value Td of the temperature of the drum 22 may be approximated to the current temperature Td_p of the drum 22 by appropriately setting the Zpower value. In particular, in the temperature equation (Equation 1), the first term of the right side is a value used to compensate so that the second detection value T2 of the second temperature sensor 80b follows the actual temperature of the drum 22, and is influenced by the Z value. Here, Z is a value that varies depending on the variable Zpower. If Zpower is properly set, the estimated value Td approximating the actual temperature Td_p of the drum 22 may be obtained. The Zpower value according to the input of the induction heater 70 may be previously set through an experiment that the estimated value Td of the drum 22 obtained while varying the input of the induction heater 70 follows the actual temperature Td_p of the drum 22.

Meanwhile, in FIG. 6, the input of the induction heater is gradually decreased so that the actual temperature Td_p of the drum 22 does not exceed about 160 degrees Celsius. Here, examining a section (i.e., a section in which the detection value of the first temperature sensor 80*a* is gradually decreased) in which the input of the induction heater 70 is gradually decreased, the actual temperature Td_p of the drum 22 is maintained within a certain range even though the output (input) of the induction heater 70 is reduced. However, the first detection value T1 of the first temperature sensor 80*a* is gradually decreased and the second detection value T2 of the second temperature sensor 80*b* does not vary greatly. Accordingly, it can be seen that the difference between the first detection value T1 and the second detection value T2 is gradually reduced.

This means that the value of (T1−T2) is decreased in the first term (i.e., the term compensating T2 so that the estimated value Td of the temperature of the drum 22 may be approximated to the actual temperature Td_p of the drum 22) in the left side of the temperature equation (Equation 1). Therefore, in order for the estimated value Td of the temperature of the drum 22 in the temperature equation to approximate the actual temperature Td_p of the drum, Z should be increased. That is, by compensating T2 by setting Zpower inversely proportional to (T1−T2) (or by setting inversely proportional to the input of the induction heater 70), the estimated value Td of a value approximate to the actual temperature Td_p of the drum 22 can be finally obtained.

Meanwhile, as shown in the temperature equation (Equation 1), the temperature Td of the drum takes T1 as a variable. Since T1 is a value which is changed sensitively to the output of the induction heater 70, the temperature Td of the drum 22 obtained by the temperature equation reflects the output change of the induction heater 70. This means that the variation of the temperature of the drum 22 due to the output change of the induction heater 70 can be detected quickly.

Particularly, when the output of the induction heater 70 is changed, the temperature change of the air in the tub 40 is accomplished slower than the temperature change of the drum 22. Therefore, in the conventional method of detecting the temperature of the air by using only a single temperature sensor, the temperature change of the drum 22 due to the output change of the induction heater 70 can not be detected sensitively. However, in the case of the present disclosure, since the heat value Q1 of the first temperature sensor 80*a* that sensitively reflects the output of the induction heater 70 is considered in the process of obtaining the temperature Td of the drum 22. Accordingly, the change in the temperature of the drum 22 can be detected more sensitively and quickly than in the conventional method.

Meanwhile, when the second temperature sensor 80*b* is also heated by the induction heater 70 like the first temperature sensor 80*a* (e.g., when the second temperature sensor 80*b* has the same structure as the first temperature sensor 80*a*), the first temperature sensor 80*a* is disposed within an effective heating range (See S1 in FIG. 4) in which the temperature of the tube 812 of the first temperature sensor 80*a* is raised by the magnetic flux (or a magnetic field generated by the induction heater 70) radiated from the induction heater 70, and the second temperature sensor 80*b* is disposed outside the effective heating range (see S2 and S3 in FIG. 4).

Here, the effective heating range is set such that, when the output of the induction heater 70 is changed, a temperature change of the first temperature sensor 80*a* positioned within the effective heating range has a phase (i.e., a large phase) that precedes the second temperature sensor 80*b* positioned outside the effective heating range. For example, when the output of the induction heater 70 is raised, the temperature of the first temperature sensor 80*a* positioned within the effective heating range first rises to a peak due to the influence of the induction heater 70, and the temperature of the second temperature sensor 80*b* positioned outside the effective heating range reaches the peak only after the heat is transferred to the air from the drum 22 and the first temperature sensor 80*a* which are heating element. Thus, the temperature T2 detected by the second temperature sensor 80*b* has a smaller phase value than the temperature T1 detected by the first temperature sensor 80*a* (i.e., the variation of T2 follows the variation of T1).

Meanwhile, according to an embodiment, even when the second temperature sensor 80*b* is implemented of a sensor which is not influenced by the induction heater 70 and disposed in the effective heating range S1, the second temperature sensor 80*b* is preferably disposed in a position further away than the first temperature sensor 80*a* in the circumferential direction from the induction heater 70.

The present disclosure compensates the measured temperature T2 of the air by using the correction values Z(T1−T2) obtained based on two temperature sensors 80*a* and 80*b* and obtains the estimated value Td which approximates to the actual temperature of the drum 22. Therefore, a deviation of more than a certain level should exists between the first detection value T1 detected by the first temperature sensor 80*a* and the second detection value T2 detected by the second temperature sensor 80*b*. For this reason, even if the second temperature sensor 80*b* is not influenced by the induction heater 70, it is preferable that the second temperature sensor 80*b* is configured to detect the temperature of an area spaced by a certain distance from the first temperature sensor 80*a* in the circumferential direction instead of detecting the temperature of the circumference of the first temperature sensor 80*a*.

Preferably, the second temperature sensor 80*b* is spaced farther away than the first temperature sensor 80*a* from the induction heater 70 in the direction of rotation of the drum 22. Since the drum 22 is cooled during the rotation of a portion heated by the induction heater 70, the heated portion is cooled when reaching a position corresponding to the second temperature sensor 80*b*, so that the detection value T2 of the second temperature sensor 80*b* can be distinguished from the detection value T1 of the first temperature sensor 80*a*.

Figure 9:
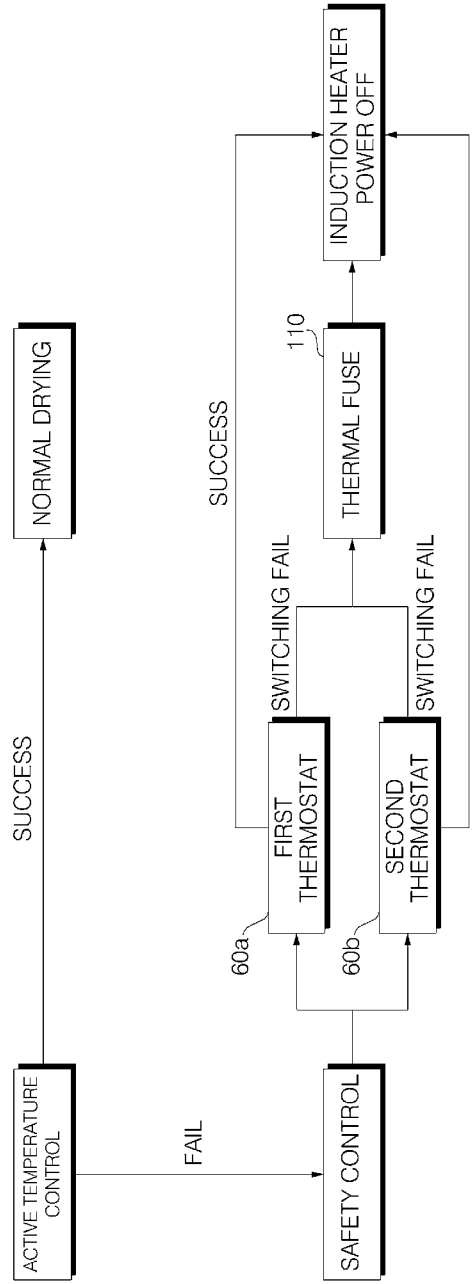
FIG. 9 is a conceptual diagram of active temperature control and safety control applied to a washing machine according to an embodiment of the present disclosure.
Figure 10:
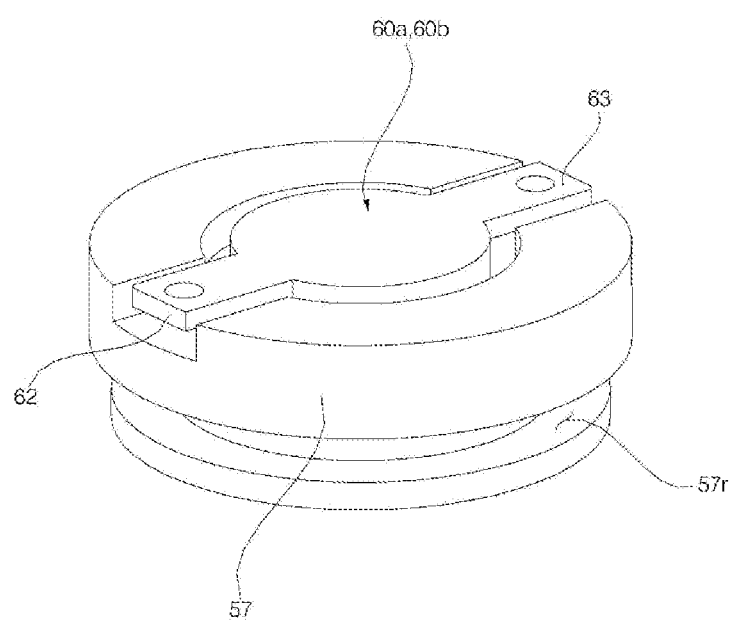
FIG. 10 is a perspective view of a thermostat.
Figure 11:
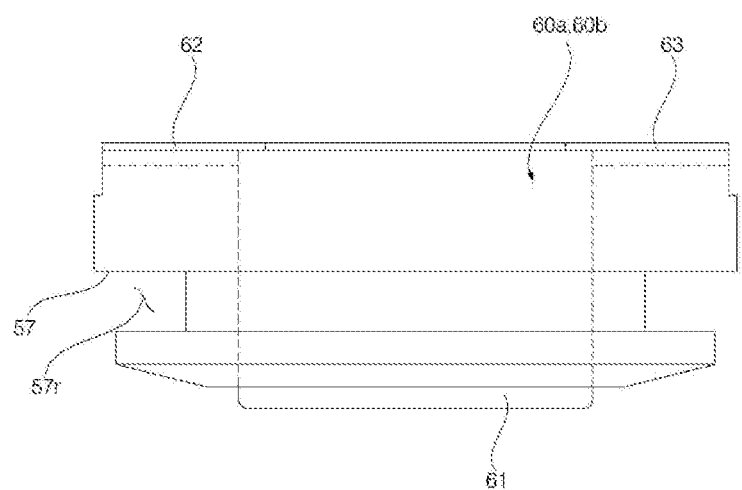
FIG. 11 is a front view of a thermostat.
Figure 12:
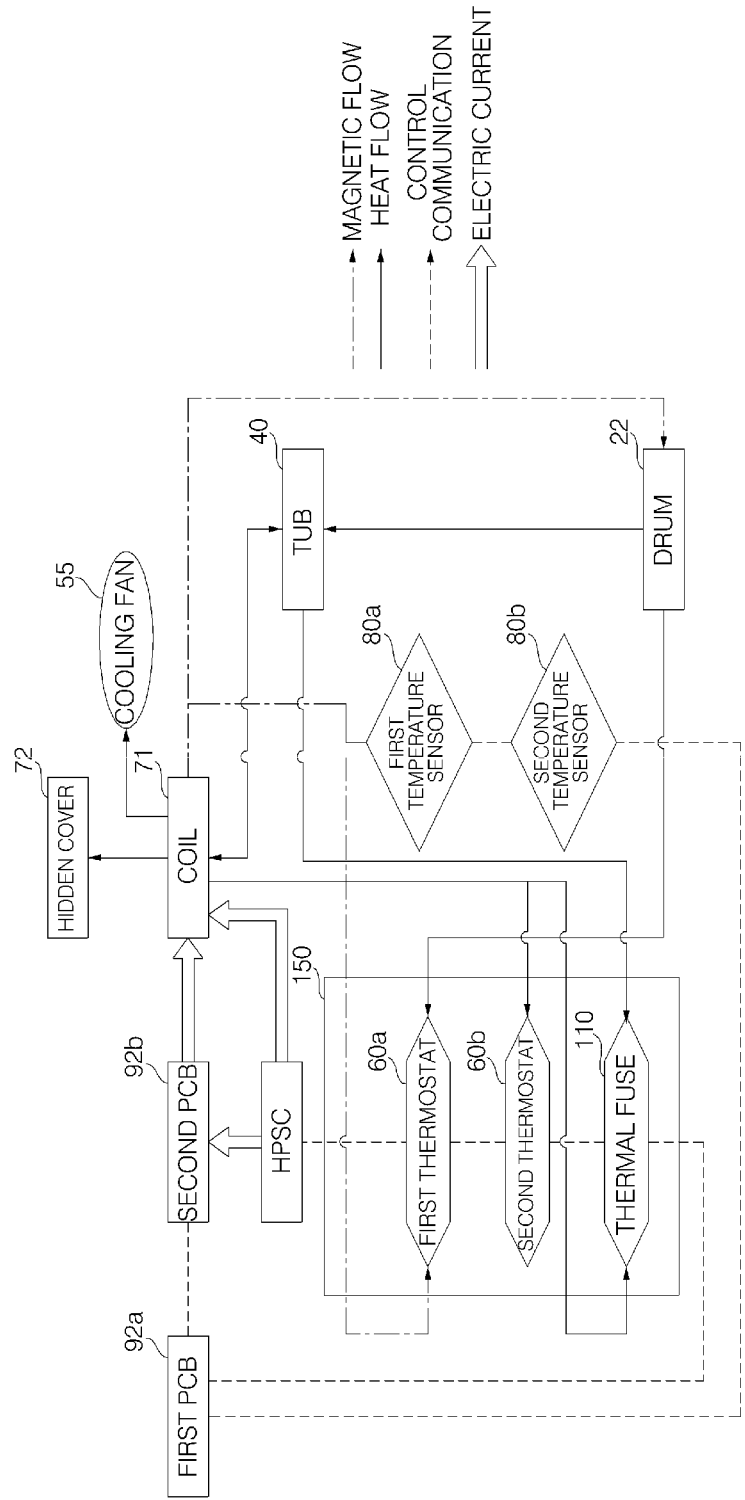
FIG. 12 is a block diagram showing magnetic flow, heat flow, control signal, and current between main components of a washing machine according to an embodiment of the present disclosure.
Figure 13:
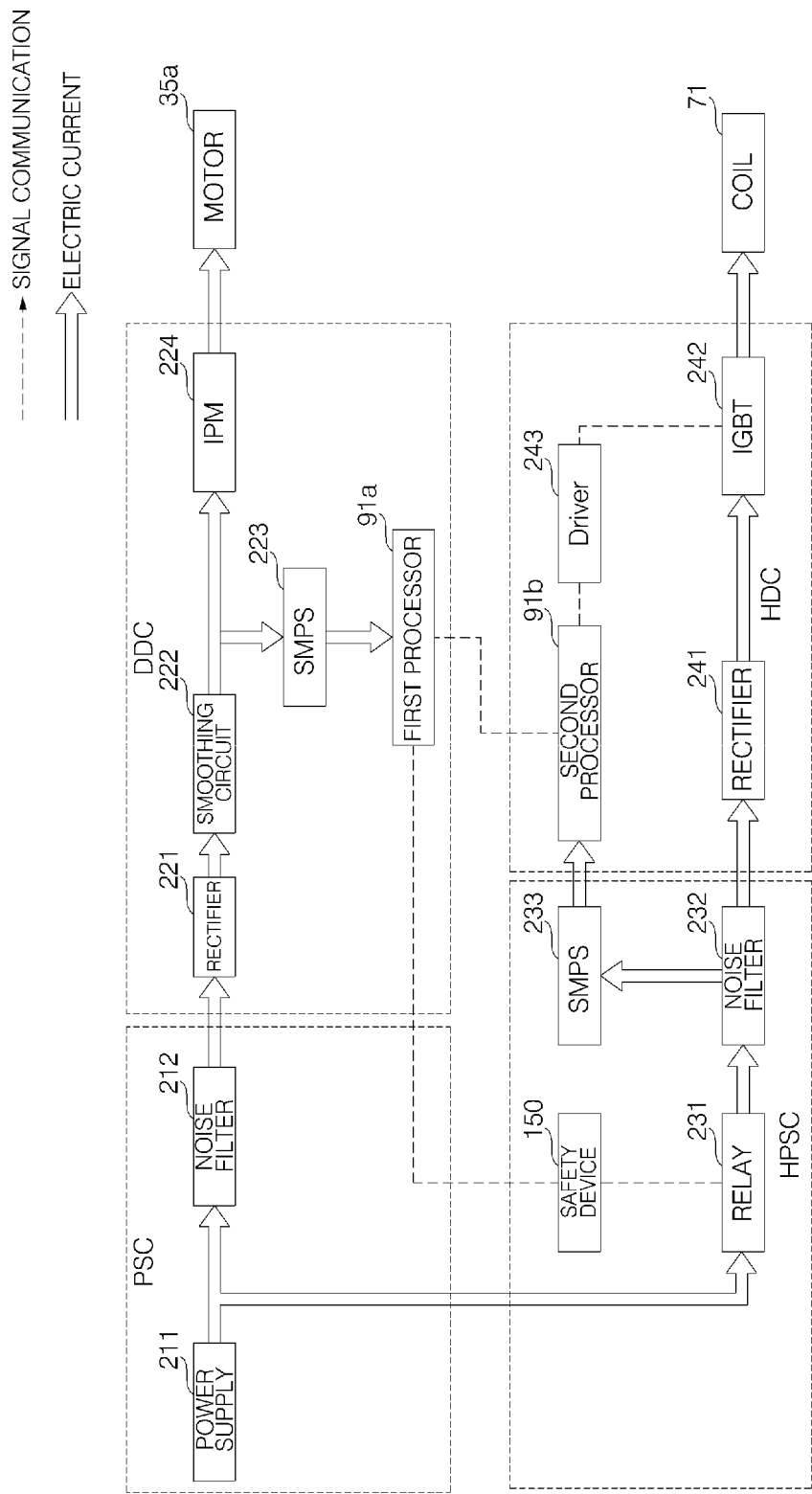
FIG. 13 is a circuit diagram of a washing machine according to an embodiment of the present disclosure.

FIG. 9 is a conceptual diagram of active temperature control and safety control applied to a washing machine according to an embodiment of the present disclosure. FIG. 10 is a perspective view of a thermostat. FIG. 11 is a front view of a thermostat. FIG. 12 is a block diagram showing magnetic flow, heat flow, control signal, and current between main components of a washing machine according to an embodiment of the present disclosure. FIG. 13 is a circuit diagram of a washing machine according to an embodiment of the present disclosure.

Referring to FIG. 9, the washing machine according to an embodiment of the present disclosure basically performs an active temperature control for controlling the operation of the induction heater 70 based on the temperatures detected by the first temperature sensor 80a and the second temperature sensor 80b. However, the washing machine is provided with a safety control system (or a power-off system) to prepare a case where the above control is not normally performed. The active temperature control is performed by the controller 91, and corresponds to a control performed based on the temperature Td of the drum 22 described above.

The safety control is performed in such a manner that the thermostat 60a, 60b and the thermal fuse 110 electrically connected to a circuit for supplying power to the induction heater 70 mechanically operate according to the ambient temperature and open the circuit to interrupt the power supply to the induction heater 70. That is, in order to prevent a safety accident due to overheating even when the active temperature control fails, the safety control system based on the thermostats 60a, 60b and the thermal fuse 110 which are mechanically operated by the ambient temperature are provided.

The thermostat 60a, 60b is an automatic temperature regulator or a constant-temperature device, and serves as an automatic switch that opens when the temperature increases and closes when the temperature decreases. Usually, the thermostat 60a, 60b uses a bimetal having two alloy plates having different linear expansion coefficients, and opens and closes a switch by using a phenomenon of changing the bow-bent degree of the bimetal depending on temperature.

The alloys used for the bimetal may include an alloy of iron and nickel that has a small expansion coefficient, and alloys of copper and zinc, nickel-manganese-iron, nickel-molybdenum-iron, and the like that have a large expansion coefficient.

Alternatively, the thermostat 60a, 60b may utilize the vaporization pressure of a liquid which is easy to vaporize. For example, toluene, or the like is sealed in a pipe, and is used for a purpose like bimetal by using expansion or contraction due to temperature.

The thermostat 60a, 60b opens the circuit when the temperature increases and the bimetal is bent (or when the liquid is vaporized) to block the power supply to the induction heater 70. In this state, when time elapses and the temperature is increased again, the bimetal is restored to its original state and the circuit is closed. That is, the thermostat 60a, 60b serves as a switch for reversibly opening and closing the circuit depending on time.

On the other hand, the thermal fuse 110 is a kind of overheat protection switch which is deformed or melted to open an electric circuit at a specific temperature, and is used for the purpose of preventing overheating of an electric device. The thermal fuse 110 may be made of a low melting point alloy wire or a ribbon that is fused (i.e., melted and broken) at a certain temperature and may be configured in such a manner that a plastic is softened and deformed at a specific temperature to open an electrical contact.

The safety control is performed firstly by the thermostat 60a, 60b, but is performed again (second safety control) by the thermal fuse 110 when the first safety control fails. The first safety control by the thermostat 60a, 60b is suitable when it is required to block the power due to temporary overheating of the induction heater 70 or the drum 22 in a situation where a serious problem does not occur in a circuit or the devices constituting the circuit.

The second safety control by the thermal fuse 110 is accomplished to permanently open the circuit when the thermostat 60a, 60b cannot be operated normally, i.e., when the thermostat 60a, 60b cannot be switched in spite of being heated above a specified temperature so that the overheated state continues.

Since the operation of the thermostat 60a, 60b or the thermal fuse 110 is caused not by the current flowing in the circuit but by the change of ambient temperature, the operation is achieved regardless of the cause of the overheating of the induction heater 70 or the drum 22, so that the operation of the induction heater 70 which is a controllable heat source can be stopped preferentially.

Hereinafter, such safety control will be described in more detail.

The first thermostat 60a is disposed between the drum 22 and the tub 40 and is operated (or switched) according to the temperature of a first air (i.e., air around the first thermostat 60a). The first thermostat 60a is operated (switched) at a first safety control temperature to open a circuit for supplying power to the induction heater 70. The first safety control temperature is a temperature of the first air set to correspond to a case where the temperature of the drum 22 is in a first safety temperature range. Here, the first safety temperature range and the first safety control temperature are values previously determined based on an operation condition of the washing machine according to a preset standard.

When the circuit is opened by the first thermostat 60a, the temperature of the drum 22 falls within the first safe temperature range. At this time, the circuit is opened by the first thermostat 60a so that the temperature of the drum 22 is controlled so as not to exceed the upper limit of the first safety temperature range.

Since the first safety control temperature is the temperature of the air outside the drum 22, it differs from the temperature of the drum 22. Since the heat flows from the heated drum 22 to the air, the first safety control temperature is lower than the first safety temperature range. Preferably, the first safety control temperature is a value smaller than a lower limit of the first safety temperature range. The first safety temperature range may be between 190 degrees and 200 degrees Celsius, and the first safety control temperature may be 110 degrees Celsius. Particularly, since the tub 40 may be deformed or burned by heat as the material of the tub 40 is a synthetic resin, the maximum temperature should preferably be controlled to be equal to or less than 105 degrees Celsius, and when the first safety control temperature is 110 degrees Celsius, such condition can be satisfied.

Meanwhile, the tub 40 may be provided with an installation port in which the first thermostat 60a is installed, and the first thermostat 60a may be inserted into the installation port. Referring to FIGS. 10 and 11, in a state in which the first thermostat 60a is positioned in the installation port, a sealing mount 57 for supporting the first thermostat 60a and sealing a gap between the first thermostat 60a and the installation port may be further provided.

The sealing mount 57 is, as a whole, in the form of a cylindrical shape having a hollow to which the first thermostat 60a is inserted. An annular concave groove 57r is formed on the outer circumferential surface of the sealing mount 57 so that the circumference of the installation port is press-fitted into the groove 57r. The sealing mount 57 may be made of a soft material.

The upper end of the sealing mount 57 is positioned in the outer side of the tub 40 and the lower end is positioned in the inner side of the tub 40. In the first thermostat 60a, a portion 62 protruding further downward than the lower end of the sealing mount 57 comes into contact with the air in the tub 40, so that the heat is transferred from the air in the tub 40 to the first thermostat 60a. The pair of terminals 62 and 63 of the first thermostat 60a are positioned in the upper end side of the sealing mount 57, and connected to the circuit in the outside of the tub 40.

The thermal fuse 110 is disposed outside the tub 40 and operated according to the temperature of a second air (i.e., the air around the thermal fuse 110). The thermal fuse 110 operates at a second safety control temperature to open a circuit for supplying power to the induction heater 70. Here, the second safety control temperature is a temperature of the second air set to correspond to a case where the temperature of the drum 22 is in a second safety temperature range. In particular, the second safety temperature range has a larger value than the first safety temperature range. The middle value of the second safety temperature range may be larger than the middle value of the first safety temperature range. The lower limit of the second safety temperature range may be larger than the upper limit of the first safety temperature range. Here, the second safety temperature range and the second safety control temperature are values previously determined by experiment based on operating condition of the washing machine according to a preset standard.

Since the thermal fuse 110 is disposed outside the tub 40, the thermal fuse 110 is less affected by the heat generated by the heated drum 22 than the first thermostat 60a. Therefore, even if the second safety temperature range is higher than the first safety temperature range, the second safety control temperature may be lower than the first safety control temperature. That is, even if the thermal fuse 110 is configured to operate at a lower temperature than the first thermostat 60a, the temperature of the drum 22 at the time of operation of the thermal fuse 110 may be higher than the temperature of the drum 22 at the time of operation of the first thermostat 60a. The second safety temperature range is from 220 degrees Celsius to 240 degrees Celsius (at this time, the temperature of the coil ranges from 110 degrees Celsius to 130 degrees Celsius), and the second safety control temperature may be 100 degrees Celsius, but it is not limited thereto.

A second thermostat 60b that operates by the heat of the induction heater 70 may be further provided. The second thermostat 60b opens a circuit at a third safety control temperature. Here, the third safety control temperature is a temperature of the second thermostat 60b set to correspond to a case where the heat temperature of the induction heater is in a third safety temperature range. The second thermostat 60b may be disposed outside the tub 40, and the third safety control temperature may be lower than the second safety control temperature.

It is preferable that the second thermostat 60b is disposed at a position close to the induction heater 70, particularly, at a position closer to the induction heater 70 than the thermostat 60a so that the heat amount generated from the induction heater 70 can be sufficiently transmitted to the second thermostat 60b.

Meanwhile, assuming that the temperature of the coil 71 is Tc at the time when the induction heater 70 normally operates in a preset standard and that, at this time, the temperature of the second thermostat 60b (or the temperature of the ambient air) is Ts2, the third safety temperature range is from 1.18 Tc to 1.32 Tc, and the third safety control temperature ranges from 1.2 Ts2 to 1.3 Ts2 (preferably, 1.25 Ts2). The third safety temperature range may be from 95 degrees Celsius to 105 degrees Celsius, and the third safety control temperature may be 80 degrees Celsius, but is not limited thereto.

Referring to FIG. 13, the controller 91 may include a first processor 91a that controls the driving unit 35 and controls the overall operation of the washing machine, and a second processor 91b that controls the induction heater 70. The first processor 91a and the second processor 91b may be electrically connected to each other to communicate with each other. Particularly, the second processor 91b may control the heat of the induction heater 70 according to an instruction applied from the first processor 91a.

Meanwhile, in FIG. 12, a first PCB 92a is a circuit board on which the first processor 91a is mounted, and a second PCB 92b is a circuit board on which the second processor 91b is mounted and is connected to the first PCB 92a The magnetic force generated in the coil 71 of the induction heater 70 may heat not only the drum 22 and the first temperature sensor 80a but also heat in some degree the first thermostat 60a positioned within the effective heating range, but the heating amount is not so large.

Referring to FIG. 12, the flow of heat at the time when the induction heater 70 is operated is divided into the heat exchange between the heated coil 71 and the tub 40, the heat amount transferred from the drum 22 to the first temperature sensor 80a and the second temperature sensor 80b through the air as medium, the heat amount transferred to the thermal fuse 110 from the tub 40 heated by the heat of the drum 22, and the heat amount transferred to the thermal fuse 110 and the second thermostat 60b due to the heat of the coil 71.

Particularly, since the first thermostat 60a is directly affected by the heat of the drum 22, the temperature of the first thermostat 60a has a close correlation with the temperature of the drum 22. Therefore, the safety control of the present disclosure is achieved in such a manner that the temperature in the drum 22 is controlled not to exceed the first safety temperature range, based on the first thermostat 60a which is primarily sensitive to the temperature change of the drum 22.

In addition, the thermal fuse 110 is affected by both the heat of the drum 22 transferred through the tub 40 and the heat of the coil 71. Therefore, even if the temperature of the drum 22 is controlled in a range lower than the first safe temperature range (i.e., even if the circuit is not opened by the first thermostat 60a as the temperature of the drum 22 falls within a normal range), the power supplied to the coil 71 is blocked by the thermal fuse 110 when the coil 71 is abnormally overheated as in the case where the coil 71 is short-circuited.

Since the thermal fuse 110 is controlled in an irreversible manner, it needs to be replaced once it operates. Therefore, it is preferable to provide a device that can attempt to control the abnormal heating of the coil in a reversible manner before the thermal fuse 110 operates. In this respect, the second thermostat 60b which is operated in response to the heat of the coil 71 like the thermal fuse 110 is further provided.

Hereinafter, it is illustrated that the safety device 150 includes the first thermostat 60a, the second thermostat 60b, and the thermal fuse 110.

As described above, the safety device 150 is configured such that the first thermostat 60a, the second thermostat 60b, and the thermal fuse 110 operate at respective safety control temperatures, thereby opening a circuit for supplying power to the induction heater 70. That is, when a heater power supply circuit HPSC is opened by the safety device 150, the current applied to the coil 71 is blocked. This will be described in more detail below.

Referring to FIG. 13, the washing machine according to an embodiment of the present disclosure may include a power supply circuit PSC, a heater power supply circuit HPSC, a heater driving circuit HDC, and a drum driving circuit DDC.

The power supply circuit PSC may include an input power 211 and a noise filter 212. The input power 211 may be an AC power. The alternating current applied from the input power 211 is applied to the heater power supply circuit HPSC and used as the driving source of the induction heater 70 or is applied to the drum driving circuit DDC and used as the driving source of the motor 35*a*.

A relay 231 for interrupting the current applied from the input power 211 to the coil 71 of the induction heater is provided. The heater power supply circuit HPSC includes a relay 231, a noise filter 232, and a switching mode power supply (SMPS).

The relay 231 is electrically connected to the first processor 91*a*. The relay 231 electrically connects (or circuit connects) or disconnects the input power 211 to the heater power supply circuit HPSC under the control of the first processor 91*a*. The relay 231 includes an electromagnetic relay for physically moving a contact by the electromagnet to open and close the contact, a reed relay having a structure in which a metal reed of a ferromagnetic material is enclosed in a container together with an inert gas and a coil is wound around the container and the reed opens and closes a contact according to a magnetic field generated when a current flows through the coil, a semiconductor relay (e.g., a solid state relay (SSR)) that opens and closes a large output voltage with a small input power by using a semiconductor element such as a thyristor or a photocoupler, and the like, but the present disclosure is not limited thereto, and may be implemented by other known ones.

The relay 231 is operated in accordance with a control command (or instruction) applied from the first processor 91*a*. That is, in response to the control command received via a line in a state of being electrically connected to the first processor 91*a*, the relay 231 supplies the current output from the input power 211 to the heater power supply circuit HPSC do.

The safety device 150 is connected to a circuit connecting the first processor 91*a* and the relay 231. Thus, when the safety device 150 operates and the circuit is opened, the electrical connection between the relay 231 and the processor 91*a* is released and the control command can no longer be transmitted, so that the relay 231 is opened and power can no longer be supplied from the input power 211 to the heater power supply circuit HPSC.

The drum driving circuit DDC includes a rectifier 221 for converting an alternating current (AC) passed through the noise filter 212 into a direct current (DC), a smoothing circuit 222 for reducing a pulsating current included in the output voltage of the rectifier 221, a SMPS 223 for converting the current outputted from the smoothing circuit 222 and driving the first processor 91*a*, and an intelligent power module (IPM) 224 for switching the current outputted from the smoothing circuit 222 and driving the motor 35*a*.

The heater driving circuit HDC includes a rectifier 241 for rectifying the AC that passed through the noise filter 232, a switching element 242 for switching the current outputted from the rectifier 241 and applying to the coil 71, and a driving driver 243 for driving the switching element 242 under the control of the second processor 91*b*. In an embodiment, the switching element 242 is configured of an insulated gate bipolar transistor (IGBT), but is not necessarily limited thereto.

Even if the power of the induction heater 70 is blocked by the operation of the safety device 150, the power supply to the drum driving circuit (DDC) is continuously performed, so that the driving of the drum 22 can be normally performed. Particularly, even if the thermal fuse 110 is fused, the drum 22 is driven normally. Therefore, a simple washing (or rinsing) or dewatering may be performed until the thermal fuse 110 is replaced.

Meanwhile, according to an embodiment, even when the controller 91 determines that the active temperature control is not performed normally, the operation of the induction heater 70 is not stopped immediately, but more alternatives can be provided to control the temperature of the drum 22.

Specifically, the controller 91 may select a temperature sensor which operates abnormally among two temperature sensors 80*a* and 80*b*, based on the temperature change of the first temperature sensor 80*a* or the second temperature sensor 80*b*. In this case, it can be determined that the active temperature control is not normally performed.

For example, when a temperature increase amount of the first temperature sensor 80*a* (or the second temperature sensor 80*b*) is below a first reference increase amount (a second reference increase amount in case of the second temperature sensor 80*b*) until a set time elapses after the operation of the induction heater 70 is started, the controller 91 may determine that the first temperature sensor (or the second temperature sensor 80*b*) is failed. In this case, the controller 91 (e.g., the first processor 91*a*) does not immediately block the power applied to the induction heater 70, but may control the heat of the induction heater 70 based on the detection value (or the detection value of the first temperature sensor 80*a*) of the second temperature sensor 80*b* that normally operates.

That is, the controller 91 may control the heat of the induction heater 70 so that the detection value of the second temperature sensor 80*b* is maintained in a preset second safety control temperature range (or the detection value of the first temperature sensor 80*a* is maintained in a preset first safety control temperature range).

FIG. 14A shows the positions where the first thermostat 60*a* can be installed based on an induction heater 70, and FIG. 14B shows the state where the first thermostat is installed in respective positions when viewed from the front of the tub 40.

The first thermostat 60*a* is installed in the tub 40 and disposed below the induction heater 70. The temperature of a corresponding portion of the drum 22 is varied depending on a position of the corresponding portion of the drum 22 with respect to the induction heater 70. Thus, the temperature of the first thermostat 60*a*, which is mainly influenced by the temperature of the drum 22, will also vary depending on the position.

Figure 15A:
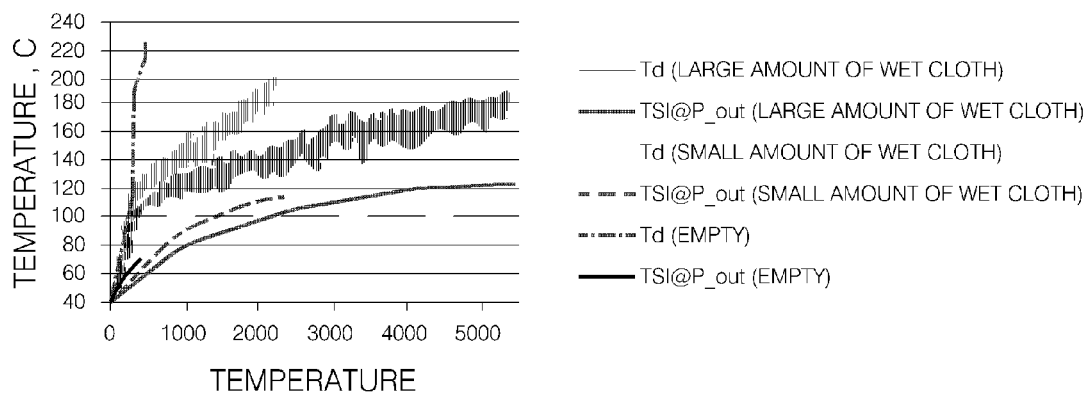
FIGS. 15A to 15C are graphs showing a temperature of a first thermostat detected in each position shown in FIG. 14A while heating a drum by operating an induction heater.
Figure 15B:
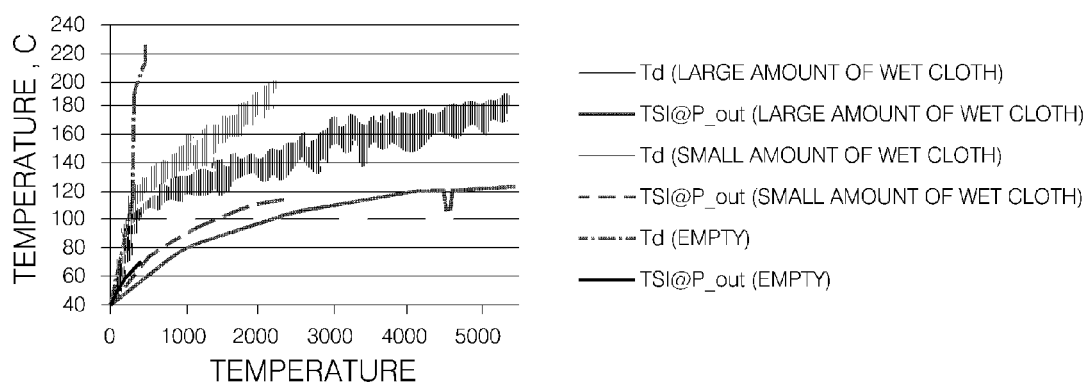
Figure 15C:
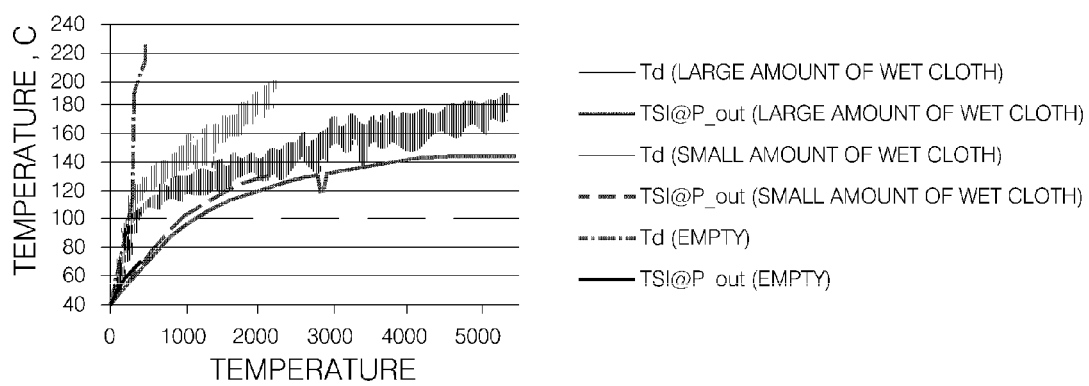

FIGS. 15A to 15C are graphs showing a temperature of a first thermostat detected in each position shown in FIG. 14A while heating a drum by operating an induction heater. FIG. 15A shows detected temperatures when the first thermostat 60*a* is positioned in an outer position (hereinafter, referred to as "outer position (P_out)") of the induction heater 70, FIG. 15B shows detected temperatures when the first thermostat 60*a* is positioned in an outer boundary position (hereinafter, referred to as "boundary position (P_half)") of the induction heater 70, and FIG. 15C shows detected temperatures when the first thermostat 60*a* is positioned in an inner position (hereinafter, referred to as "inner position (P_in)") of the induction heater 70. In addition, the "large amount of wet cloth" means a state in which 3.5 kg of a wet cloth (or a laundry wet with water) is put into the drum 22, the "small amount of wet cloth" means a state in which a certain amount of wet cloth not exceeding 1 kg is put into the drum 22, and the "empty" means a state in which laundry is not put into the drum 22. "Td" is the temperature of the drum 22, "TS1" is the temperature of the first thermostat 60a, and "@" indicates that the temperature is measured at a position followed by "@", for example, TS1@P_out is the temperature of the first thermostat 60a disposed in the outer position P_out.

In the graphs, it can be seen that when the first thermostat 60a is positioned in the outer position (P_out), the temperature TS1@P_out is relatively slowly achieved in comparison with other cases.

When the first thermostat 60a is positioned in the inner position P_in, the temperature itself TS1@P_in of the first thermostat 60a is higher more than needs (even in the case of large amount of wet cloth, it goes up to 140 degrees Celsius or more), so that damage (or thermal deformation) of the tub 40 may occur.

Therefore, the first thermostat 60a is preferably disposed in the boundary position P_half, though it is not necessarily limited thereto.

Meanwhile, when viewed from above, the boundary position P_half is a position where the first thermostat 60a is partially overlapped with the induction heater 70, preferably, a position where the first thermostat 60a is positioned in the outer edge of the coil 71 or in the outer edge of the heater base 74, when the first thermostat 60a is spaced from the center of the coil 71 by a certain distance in the circumferential direction of the drum 22. Here, the outer edge of the coil 71 is an outer edge of a portion spaced from the center of the coil 71 in the circumferential direction of the drum 22 and, as in the embodiment, corresponds to a side extended in the forward and backward directions when the overall shape of the coil 71 is in the form of a long plate in the front-back direction than in the left-right direction.

In addition, in the embodiment, the first thermostat 60a is positioned in the left side of the induction heater 70 when viewed from the front, but it is not limited thereto, and may be disposed in the right side. Further, in the embodiment, the first thermostat 60a is positioned in the front side based on a midpoint M of the length of the tub 40, but can be positioned in the rear side.

The midpoint M may be defined as a portion where the tub front portion 41 and the tub rear portion 42 are coupled to each other, and the position is not necessarily the half of the length of the tub 40 in the front-rear direction.

Referring to the graphs, the first thermostat 60a is disposed in the boundary position P_half, and in order to prevent the temperature of the drum 22 from exceeding 220 degrees Celsius (i.e., when the first safety temperature range is set to 220 degrees Celsius or less), under the condition of small amount of wet cloth, the first safety control temperature may be set to 120 degrees Celsius. Assuming that the laundry is not put into the drum 22 under the same conditions (in this case, the temperature of the drum 22 has substantially the same change as the case in which the input wet cloth is completely dried). When the temperature (TS1@P_half(empty)) of the first thermostat 60a reaches 120 degrees Celsius, the temperature of the drum 22 is raised to approximately 260 degrees Celsius.

That is, assuming that the first thermostat 60a is disposed in the boundary position P_half, when small amount of wet cloth is put into the drum 22, the temperature of the drum 22 can be controlled by the first thermostat 60a so as not to exceed 210 degrees Celsius. Even if the laundry in the drum 22 is completely dried (corresponding to the case where there is no laundry in the drum 22), the temperature of the drum 22 can be controlled so as not to exceed 260 degrees Celsius. Meanwhile, in the case of large amount of wet cloth under the same condition, the temperature of the drum 22 is controlled not to exceed 180 degrees Celsius.

Meanwhile, when the first thermostat 60a is disposed in the outer position P_out, the temperature of the drum 22 is raised up to 220 degrees Celsius under the condition of small amount of wet cloth when the first safety control temperature is 120 degrees Celsius, and the temperature of the drum 22 is raised up to 290 degrees Celsius in the dry (fully dried) state, so that there is a risk of over-heating and denaturalization of the clothes.

In addition, when the first thermostat 60a is disposed in the inner position P_in, the temperature of the drum 22 is raised up to 200 degrees Celsius under the condition of small amount of wet cloth when the first safety control temperature is 150 degrees Celsius, and the temperature of the drum 22 is raised up to 240 degrees Celsius in the dry (fully dried) state. In this case, there is no risk of over-heating and denaturalization of the clothes, but there is a risk of damaging the tub 40 as the first safety control temperature is high.

Figures 16A, 16B:
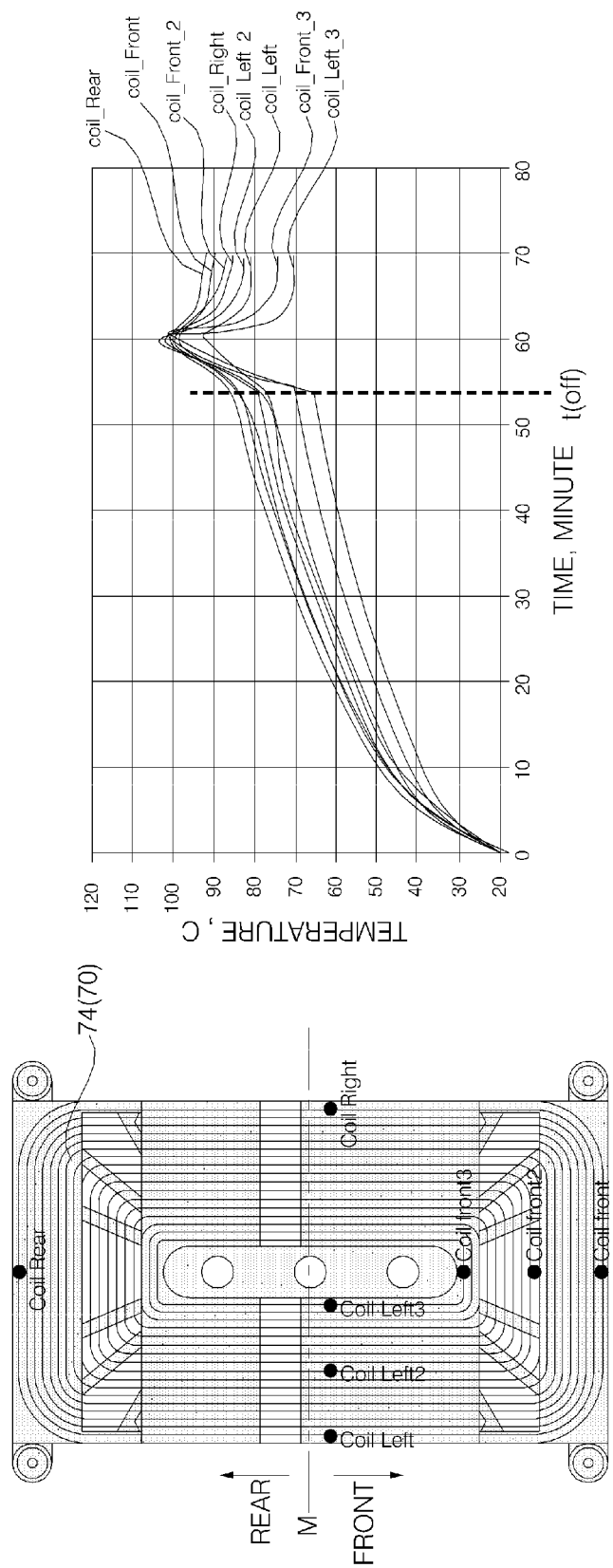
FIG. 16A shows the positions on a heater base and FIG. 16B shows a temperature change in respective positions.

FIG. 16A shows the positions on a heater base 74 and FIG. 16B shows a temperature change in respective positions. Particularly, FIG. 16B shows the temperature measured at each point shown in FIG. 16A while operating the induction heater 70 and the cooling fan 55, and the operation of the cooling fan 55 is stopped after the time t(off). As can be seen from the graphs, the temperature suddenly rises at any position after the operation of the cooling fan 55 is stopped. (for reference, the temperature falls again from approximately 60 minutes, because the operation of the induction heater 70 is stopped from this point.)

Particularly, it can be seen that the temperature rise is large in a position (e.g., Coil_Left_2 position) near a central portion of the heater base 74 (or a central portion of the coil 71). Therefore, when the second thermostat 60b is disposed in the center of the heater base 74, it is possible to quickly cope with the overheating of the induction heater 70 due to the failure of the cooling fan 55. Preferably, the second thermostat 60b is disposed in an area (i.e., the inner area according to the above definition) that is completely overlapped with the heater base 74 (or the coil 71) when viewed from above, but the present disclosure is not limited thereto.

Meanwhile, when the second thermostat 60b is disposed in contact with the coil 71, there is a risk of the short circuit of the coil 71, thereby further requiring insulation means. Therefore, the second thermostat 60b should preferably be spaced apart from the coil 71, and, due to this condition, the installation position thereof is restricted to the lower side of the heater cover 72 or the heater base 74.

However, as it progresses to the center of the heater cover 72, the distance from the tub 40 positioned in the lower side thereof is reduced. In the case where the second thermostat 60b is installed below the heater cover 72, the installation is restricted due to the narrow space. Therefore, the second thermostat 60b is preferably disposed in the heater cover 72. However, the present disclosure is not limited thereto.

Figures 17A, 17B:
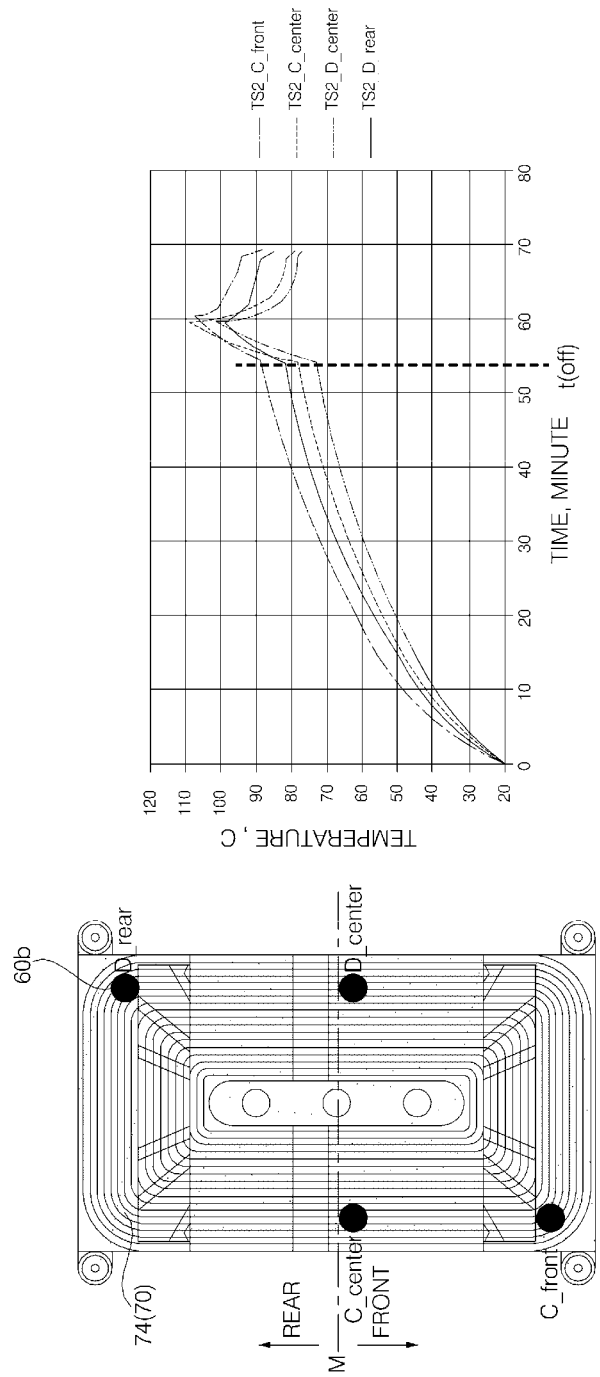
FIG. 17A shows positions where a second thermostat can be installed based on a heater base.
FIG. 17B is a graph showing a temperature change of the second thermostat in respective positions.

FIG. 17A shows positions where a second thermostat 60b can be installed based on a heater base 74, and FIG. 17B is a graph showing a temperature change of the second thermostat in respective positions. Here, "C_center" is a position in contact with the coil 71 at the middle portion of the heater base 74, "C_front" is a position in contact with the coil 71 at the front portion of the heater base 74, "D_center" is a position on the heater cover 72 corresponding to the middle portion of the heater base 74, and "D_rear" is a position on the heater cover 72 corresponding to the rear portion of the heater base 74.

As can be seen from FIG. 17B, no matter where the second thermostat 60b is installed, it can be known that the temperature rises sharply after the time t(off) at which the cooling fan 55 is stopped. Therefore, even if the second thermostat 60b is placed at any position on the heater cover 72, when the coil 71 is overheated due to the failure of the cooling fan 55, the second thermostat 60b may be operated at a preset third safety control temperature. However, as shown in the graphs, when the second thermostat 60b is positioned in the middle portion of the heater base 74 (e.g., the position C_center), the temperature of the second thermostat 60b is relatively low, thereby reducing the third safety control temperature.

For example, in FIG. 17B, the third safety control temperature may be set to about 100 degrees, when the circuit is opened so that the temperature at the C_front position does not exceed 105 degrees Celsius. Thus, the second safety control temperature may be set to be lower by 5 degrees corresponding to a difference between 105 degrees Celsius and 100 degrees Celsius.

Figure 18B:
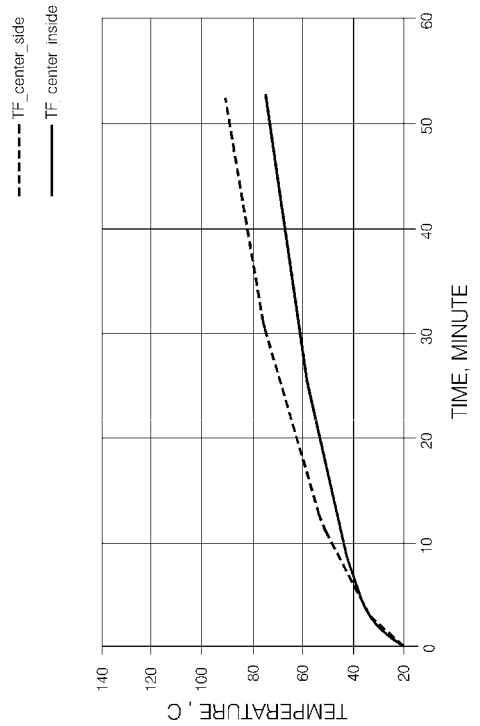
FIG. 18B is a graph showing a temperature change of the thermal fuse in respective positions.
Figure 18A:
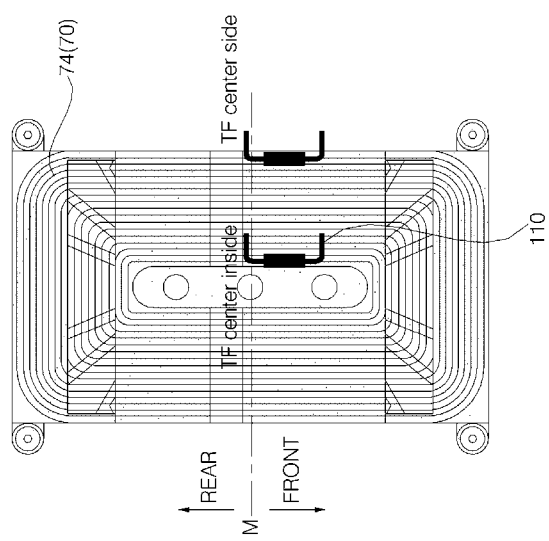
FIG. 18A shows positions where a thermal fuse can be installed based on a heater base.
Figure 19:
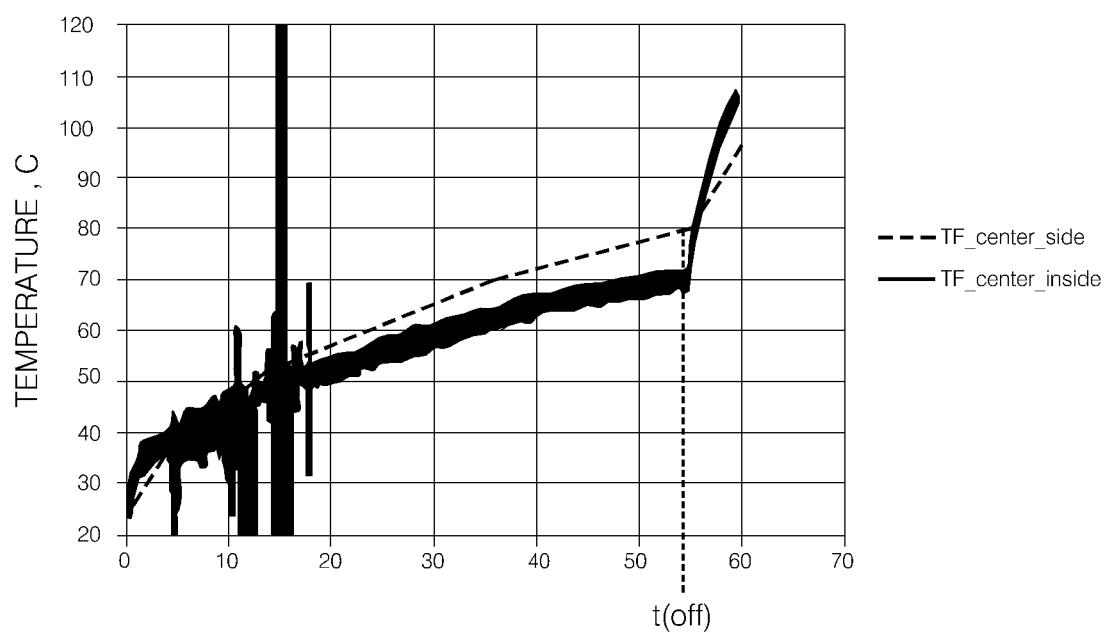
FIG. 19 is a graph showing the temperature change of the thermal fuse in each point shown in FIG. 18A when the operation of a cooling fan is stopped after t(off) after an induction heater and the cooling fan are operated.

FIG. 18A shows positions where a thermal fuse can be installed based on a heater base, and FIG. 18B is a graph showing a temperature change of the thermal fuse in respective positions. FIG. 19 is a graph showing the temperature change of the thermal fuse in each point shown in FIG. 18A when the operation of a cooling fan is stopped after t(off) after an induction heater and the cooling fan are operated.

As described above with reference to FIG. 12, the thermal fuse 110 is positioned in a position where the temperature of thermal fuse is influenced not only by the heat of the coil 71, but also by the heat transmitted from the drum 22 through the tub 40. Therefore, the position of the thermal fuse 110 may be selected based on the condition i) that the temperature rise of the thermal fuse 110 is correlated with the temperature rise of the tub 40 (or the temperature rise of the drum 22), and the condition ii) that there is also a correlation with the temperature rise of the coil 71.

With respect to the condition i), when the drum 22 is overheated, the tub 40 has the highest temperature at the lower portion of the induction heater 70, and has a high temperature at a portion (approximately, in the vicinity of the middle point M of the tub 40) corresponding to the intermediate length of the coil 71 in the front-rear direction. Thus, the thermal fuse 110 is positioned outside the tub 40 (i.e., between the heater base 74 and the curve 40), and, when viewed from above, it is preferable that at least a portion of the thermal fuse 110 is disposed in an area overlapped with the heater base 74 (or the coil 71). Further, it should be spaced apart from the coil 71 for insulation.

Preferably, the thermal fuse 110 is in contact with the tub 40, in contact with the bottom surface of the heater base 74, and positioned in the midpoint M of the tub 40 in the front and rear direction.

Meanwhile, as can be seen from the comparison between FIG. 17B and FIG. 19, even when the thermal fuse 110 is positioned in a position closer to the outer boundary than to the center as well as in a position (TF_center_side) close to the center of the heater base 74, the temperature rises abruptly after the time point t(off) at which the cooling fan 55 is stopped, which is a pattern corresponding to the temperature change of the coil 71. That is, if at least a portion of the thermal fuse 110, when viewed from above, is positioned in an area overlapped with the heater base 74 (or coil 71), the condition ii) seems to be relatively easily satisfied.

Taking all the above into consideration, the thermal fuse 110 is disposed in a position, outside the tub 40, where the thermal fuse 110 is in contact with the tub 40 or in contact with the bottom surface of the heater base 74, and it is preferable that the thermal fuse 110 is disposed approximately the middle point of the heater base 74 (or the coil 71) in the front-rear direction. Therefore, not only the inner central position (TF_center_inside) shown in FIG. 18A but also the inner edge position (TF_center_side) are suitable positions for installing the thermal fuse 110.

However, as shown in FIG. 19, the inner central position (TF_center_inside) has a lower temperature than the inner edge position (TF_center_side), which is advantageous in that the second safety control temperature can be set relatively low.

As described above, in the washing machine of the present disclosure, firstly, when the temperature of the drum using the temperature sensor is not normally controlled and is overheated, the operation of the induction heater is automatically stopped to prevent a safety accident.

Secondly, in the washing machine of the present disclosure, a circuit for transmitting a control signal to a relay for applying a current of the input power to the induction heater is configured to be opened by the safety device. Here, only a small amount of current for transmitting the control signal flows in the circuit for transmitting the control signal. That is, the present disclosure does not open the power line for transmitting the electric power for driving the induction heater by using the safety device, but is configured to open the control line constituting the circuit, so that there is no risk that an accident due to the unexpected disconnection or short circuit of the power line in the safety control process occurs.

Third, there is an effect that the power applied to the induction heater is automatically blocked not only when the drum is overheated, but also when the induction heater is overheated.

Fourth, since the safety device is configured to include a first safety control means for reversibly opening the circuit for applying power to the induction heater, the circuit can be normally operated again when the cause of overheating is removed. Further, a second safety control means for irreversibly opening the circuit when the overheated state is not resolved despite a first safety control is provided, thereby more reliably preventing a safety accident.

Fifth, since the position of the thermal fuse is optimized so that the thermal fuse is sensitive not only to the heat of the drum but also to the heat of the induction heater, there is an effect of preventing the fire due to the heat of the induction heater as well as the fire due to the heat of the drum.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims. Accordingly, the scope of the present disclosure is not construed as being limited to the described embodiments but is defined by the appended claims as well as equivalents thereto.

What is claimed is:
1. A washing machine comprising:
a tub configured to receive water;

a drum that is made of a metal material, that is disposed in the tub, and that is configured to rotate in the tub;

an induction heater spaced apart from the drum and configured to heat the drum based on a magnetic force generated by a current applied to a coil of the induction heater;

an input power source configured to supply input power to the induction heater;

a relay configured to interrupt the current applied to the coil of the induction heater;

a first processor configured to control the relay; and a safety device connected to a circuit that is configured to connect the first processor to the relay, wherein the safety device comprises:

a first thermostat configured to operate based on a first temperature of air between the drum and the tub and configured to open the circuit based on the first temperature being greater than or equal to a first safety control temperature, and a thermal fuse configured to operate based on a second temperature of air outside the tub and configured to open the circuit based on the second temperature being greater than or equal to a second safety control temperature.

2. The washing machine of claim 1, wherein the relay is configured to apply the input power to the coil based on a signal received from the first processor.

3. The washing machine of claim 2, wherein the input power comprises an alternating current (AC) power, and wherein the washing machine further comprises:

a rectifier configured to rectify the AC power transmitted through the relay; and a switching element configured to switch an output of the rectifier and supply the output of the switching element to the coil.

4. The washing machine of claim 3, further comprising a motor configured to rotate the drum, wherein the first processor is configured to control rotation of the motor, and wherein the washing machine further comprises a second processor configured to be controlled by the first processor and to control operation of the switching element based on the control of the first processor.

5. The washing machine of claim 1, wherein the safety device comprises a second thermostat that is configured to operate based on heat generated by the induction heater and that is configured to open and close the circuit based on the heat generated by the induction heater.

6. The washing machine of claim 5, wherein the second thermostat is disposed outside the tub.

7. The washing machine of claim 6, wherein the first thermostat is disposed closer to the tub than the second thermostat, and wherein the washing machine further comprises a heater cover that covers the induction heater, that is disposed outward of the induction heater, and that seats the second thermostat.

8. The washing machine of claim 7, wherein the second thermostat is configured to open the circuit based on a third temperature related to heat generated by the induction heater being greater than or equal to a third safety control temperature that is less than the second safety control temperature.

9. The washing machine of claim 1, further comprising at least one temperature sensor configured to detect a temperature of air between the drum and the tub, wherein the first processor is configured to control the induction heater within a preset control temperature range based on the temperature detected by the at least one temperature sensor.

10. The washing machine of claim 9, wherein the at least one temperature sensor comprises:

a first temperature sensor comprising:

a sensor tube made of a metal material and configured to be heated by the induction heater, at least a part of the sensor tube being exposed between the tub and the drum, and a thermistor disposed in the sensor tube; and a second temperature sensor disposed farther from the induction heater than the first temperature sensor in a circumferential direction of the tub, the second temperature sensor being configured to detect the temperature of air between the tub and the drum.

11. The washing machine of claim 10, wherein the first temperature sensor is configured to output a first detection value, and the second temperature sensor is configured to output a second detection value, and wherein the first processor is configured to, based on the first detection value increasing by an amount less than a first reference amount for a set time after a start of operation of the induction heater, control the induction heater according to the second detection value.

12. The washing machine of claim 10, wherein the first temperature sensor is configured to output a first detection value, and the second temperature sensor is configured to output a second detection value, and, and wherein the first processor is configured to, based on the second detection value increasing by an amount less than a second reference amount for a set time after a start of operation of the induction heater, control the induction heater according to the first detection value.

13. The washing machine of claim 1, wherein the first safety control temperature is the first temperature of air between the tub and the drum based on a temperature of the drum being within a first safety temperature range, and wherein the first safety control temperature is less than a lower limit of the first safety temperature range.

14. The washing machine of claim 13, wherein the first safety temperature range is between 190 and 200 degrees Celsius.

15. The washing machine of claim 14, wherein the second safety control temperature is the second temperature of air outside the tub based on the temperature of the drum being in a second safety temperature range, and wherein the second safety temperature range is greater than the first safety temperature range.

16. The washing machine of claim 15, wherein the second safety temperature range is between 220 and 240 degrees Celsius.

17. The washing machine of claim 16, wherein the first processor is configured to, based on the second temperature being within the second safety temperature range, control a temperature of the coil within a range from 110 to 130 degrees Celsius.

18. The washing machine of claim 1, wherein the first thermostat is configured to maintain the circuit to be closed based on the first temperature being less than the first safety control temperature, and wherein the thermal fuse is configured to maintain the circuit to be closed based on the second temperature being less than the second safety control temperature.

19. The washing machine of claim 18, wherein the first thermostat comprises a bimetal that comprises a pair of alloy plates having different expansion coefficients.

20. The washing machine of claim 18, wherein the thermal fuse comprises a wire configured to deform based on the second temperature being greater than or equal to the second safety control temperature.

* * * * *